United States Patent
Makwinski et al.

(10) Patent No.: US 7,262,371 B2
(45) Date of Patent: Aug. 28, 2007

(54) MODULAR RACEWAY WITH BASE AND INTEGRAL DIVIDER

(75) Inventors: Mark Makwinski, Cromwell, CT (US); Richard R. Picard, West Hartford, CT (US); Jeffery Hemingway, Burington, CT (US); Shawn Stempinski, Newington, CT (US)

(73) Assignee: The Wiremold Company, West Hartford, CT (US)

( * ) Notice: Subject to any disclaimer, the term of this patent is extended or adjusted under 35 U.S.C. 154(b) by 0 days.

(21) Appl. No.: 11/035,477

(22) Filed: Jan. 13, 2005

(65) Prior Publication Data

US 2006/0151209 A1   Jul. 13, 2006

(51) Int. Cl.
   *H02G 3/08* (2006.01)
(52) U.S. Cl. ............... 174/481; 174/480; 174/68.1; 174/68.3; 52/220.1; 52/220.7
(58) Field of Classification Search ............ 174/48, 174/49, 60, 67, 68.1, 68.3, 95, 97, 99 R, 174/96, 135, 72 R, 480, 481; 220/3.2, 3.8, 220/3.5; 385/134, 135; 439/207, 209, 210, 439/211, 212, 213; 52/220.1, 220.3, 220.7, 52/220.8, 249
See application file for complete search history.

(56) References Cited

U.S. PATENT DOCUMENTS

| | | | | |
|---|---|---|---|---|
| 594,998 | A * | 12/1897 | Lyle ................. | 174/72 R |
| 6,180,878 | B1 * | 1/2001 | Gretz .................. | 174/48 |
| 6,259,020 | B1 * | 7/2001 | Ashline et al. ......... | 174/48 |
| 6,284,975 | B1 * | 9/2001 | McCord et al. ........ | 174/49 |
| 6,323,421 | B1 * | 11/2001 | Pawson et al. ........ | 174/48 |
| 6,342,675 | B1 * | 1/2002 | DeBartolo et al. ..... | 174/50 |
| 6,362,420 | B1 | 3/2002 | Bacouelle et al. ..... | 174/48 |
| 6,384,336 | B1 * | 5/2002 | VanderVelde et al. .. | 174/95 |
| D484,469 | S | 12/2003 | Thibault ............... | D13/184 |
| 6,664,467 | B1 * | 12/2003 | de la Borbolla ........ | 174/48 |
| D486,130 | S | 2/2004 | Thibault ............... | D13/184 |
| 6,756,544 | B2 * | 6/2004 | Handler ............... | 174/68.1 |
| 6,936,766 | B1 * | 8/2005 | Galasso ............... | 174/48 |
| 7,045,707 | B1 * | 5/2006 | Galasso ............... | 174/503 |

FOREIGN PATENT DOCUMENTS

JP         2005229775         8/2005

* cited by examiner

*Primary Examiner*—Angel R. Estrada
(74) *Attorney, Agent, or Firm*—McCormick, Paulding & Huber LLP

(57) ABSTRACT

Raceway modules of predetermined length are joined by couplers designed to allow optional gaps between the T-shaped raceway base plate portions. Upper and lower L-shaped raceway covers are separately snapped out the base, allowing electrical and data/communication devices to be provided in staggered relationship, and anywhere along the raceway. The lower L-shaped raceway cover configuration allows outlet devices to be provided in the lower side of the raceway. The T-shaped base plate has prepunched knockout openings and mounting holes provided in a predetermined pattern, and prepunched lines of weakening, that simplify the installation process. The couplers come in several lengths and configurations, to bridge crossing raceway or other obstructions, and to provide continuity in the gaps between the raceway modules. Prewired cover components are fitted with spaced outlet devices for installation in areas of a room that require such service.

27 Claims, 25 Drawing Sheets

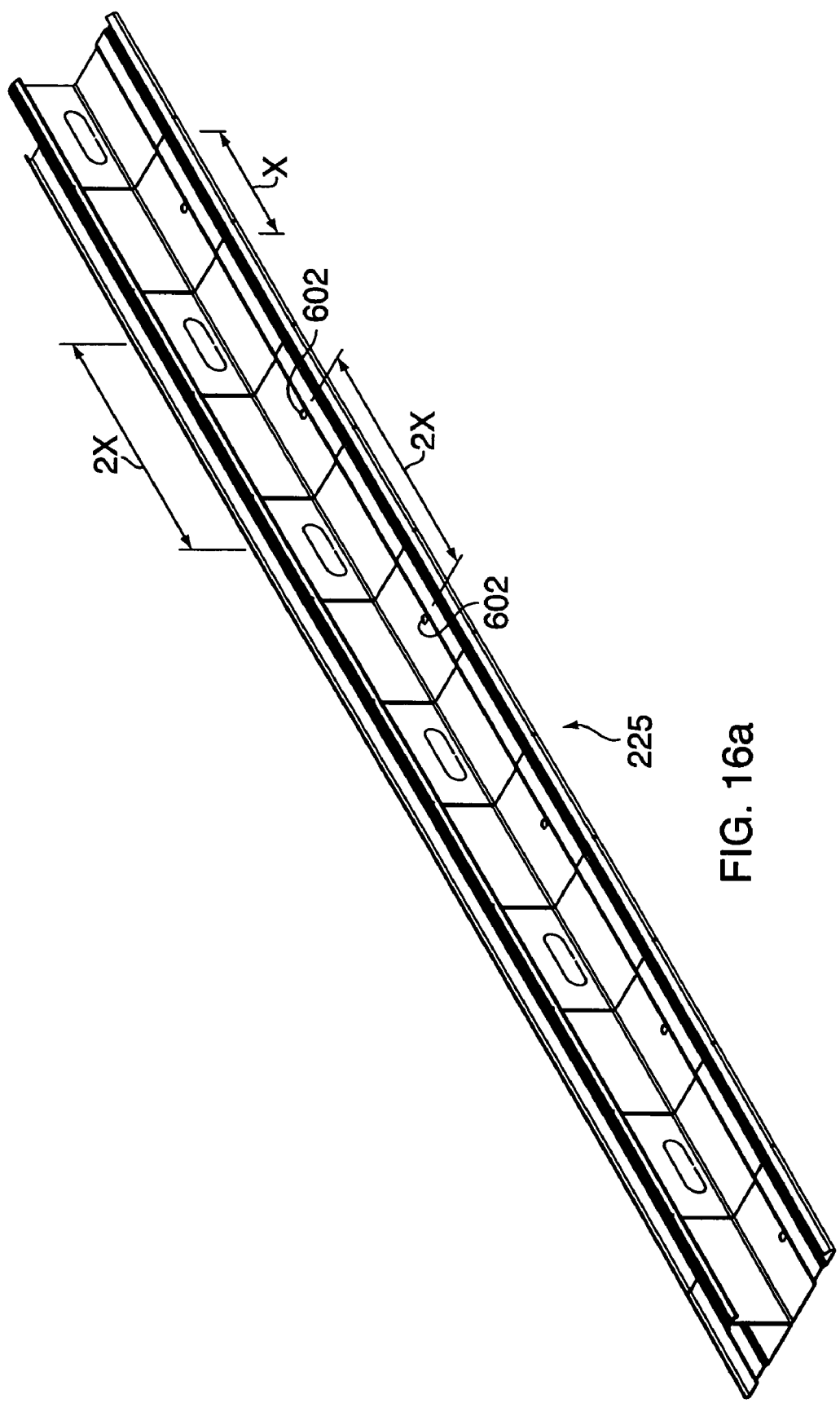

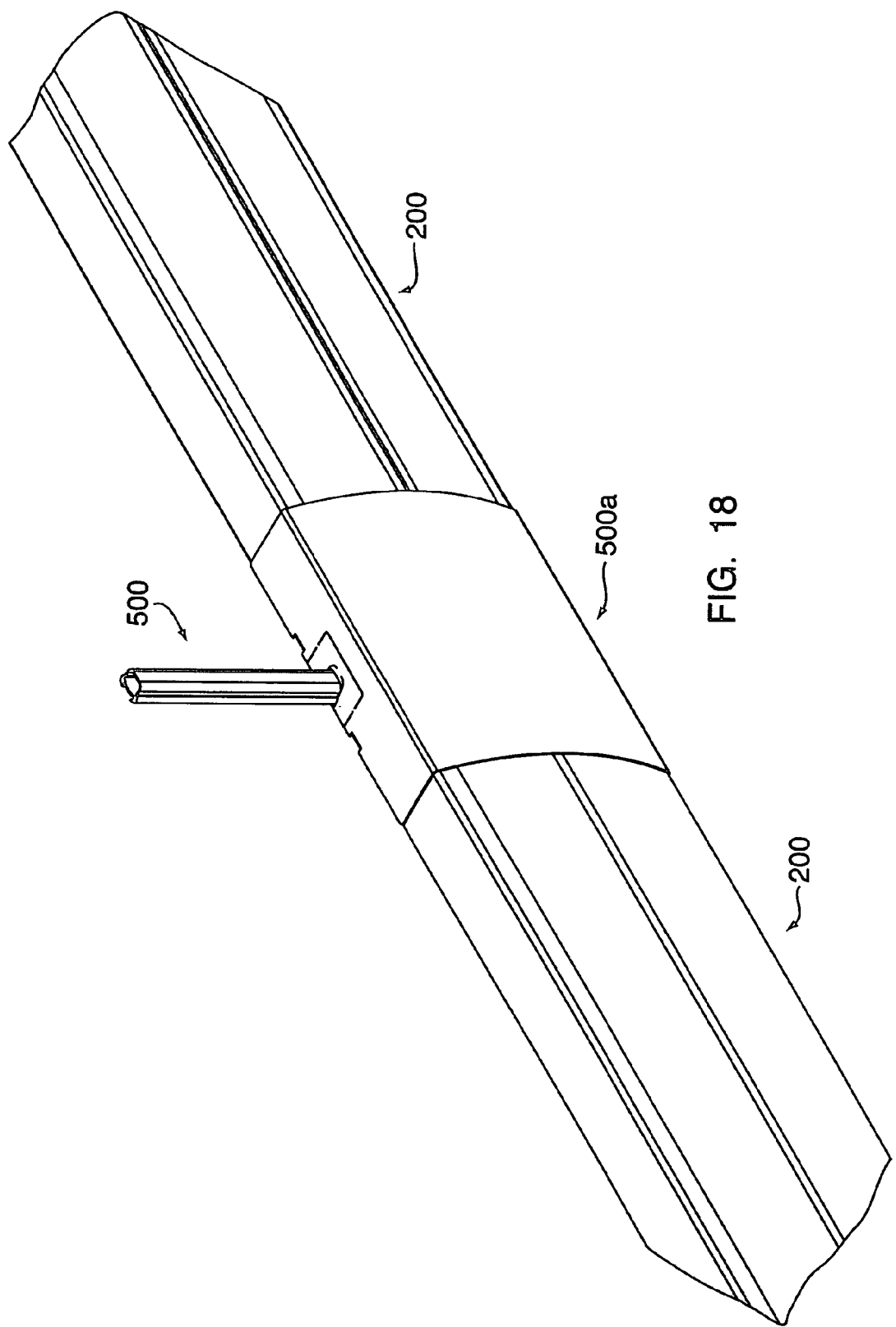

MODULAR RACEWAY WITH BASE AND INTEGRAL DIVIDER

This invention relates generally to a modular raceway system having raceway base components of predetermined length designed to be mounted to a wall structure, or to be received by wall brackets provided at predetermined intervals along a wall structure. Raceway wall brackets and/or couplers at the adjacent end portions of the raceway base components, are designed to take advantage of the unique cross section of the raceway base and provide a continuous enclosed structure for the power and/or data cabling in divided, or separated wireways, defined in part by an integrally formed divider in the base.

Another important feature of the unique T-shaped raceway base configuration lies in the uniformly spaced lines of weakening provided in the raceway base. Preassembly of the raceway base and associated covers allows for modular use at installation, and also allows for fitting of the raceway to internal wall structures of a building without the need for custom cutting of the raceway base, such as now required with raceway systems of the type available from The Wiremold Company of West Hartford, Conn. under their "3000" or "4000" two piece metal raceway designations.

Still another feature of the present invention can be attributed to the unique configurations of the raceway covers whereby separate raceway covers are provided for each of the two wireways defined in part by the T-shaped base components. The cover components are generally L-shape in cross section and have end portions designed to mate with the forward or leading edge of the integrally formed divider defined in the base, and to mate as well with the longitudinally extending marginal upper and lower edges of the base. Upper and lower cover components are mounted to the base, and offer flexibility in the placement of power and data/communication outlet devices in one or the other or in both of these cover components.

Still further features of the present invention are achieved as a result of the unique geometry for individual device brackets designed for use in the L-shaped raceway covers. More particularly, each individual device bracket has an L-shaped frame, with flanges that are received by projecting lips on the forward or leading edge of the divider in the T-shaped base. Each individual device bracket further includes a socket in the other leg of the L-shaped device bracket that mates with marginal free edge in the divider, or stem of the T-shaped raceway base. As a result of the unique design for a modular raceway as outlined above, outlet devices can be provided in the upper or lower wireways and need not be provided one above the other. Outlet devices and/or data communication devices can also be provided in the downwardly facing surface of the lower L-shaped raceway cover in a somewhat hidden, and better protected position then prior art raceways provided for these device brackets, and the connectors that plug into the devices. This location for the outlet devices contributes to an aesthetically pleasing appearance for a modular raceway system constructed and installed in accordance with the present invention.

BRIEF DESCRIPTION OF THE DRAWINGS

FIG. 3 also illustrates in exploded relationship the geometry of device brackets and device bracket "covers" such as are suitable for use in a raceway of the type disclosed herein.

FIG. 16a shows a T-shaped base 225 having spaced lines of weakening, and alternately arranged knock-out openings in the web, and in the base for mounting to a wall structure. The knock-out openings provide access for wiring between wireways.

FIG. 18 is a perspective view of two aligned raceway sections 200, 200 that are joined by a transition fitting, and bridging or linking one wireway with another raceway of smaller capacity.

DETAILED DESCRIPTION

Turning now to the drawings in greater detail, a wall structure is indicated generally at W1 and W2, defining a corner which is internal as shown, to represent the environment where a raceway of the present invention can be provided. See for example, FIGS. 5 and 6 where both internal and external corners are illustrated, and where drop down raceway segments are provided for bringing electrical cables to the raceway.

In accordance with the first embodiment of the present invention, a modular raceway is provided, and includes standard length raceway sections of length L that can be secured to the walls W1 or W2, by wall brackets as indicated at 100, 100a. Corner brackets can be fabricated from these unique wall brackets 100, as indicated at 101. Thus, the corner bracket 101 may comprise individual brackets fabricated from the wall brackets 100, 100a, to form a corner bracket 101. It will also be apparent that this same approach can be used to form a corner bracket that can be utilized at an external corner.

Figure 3:
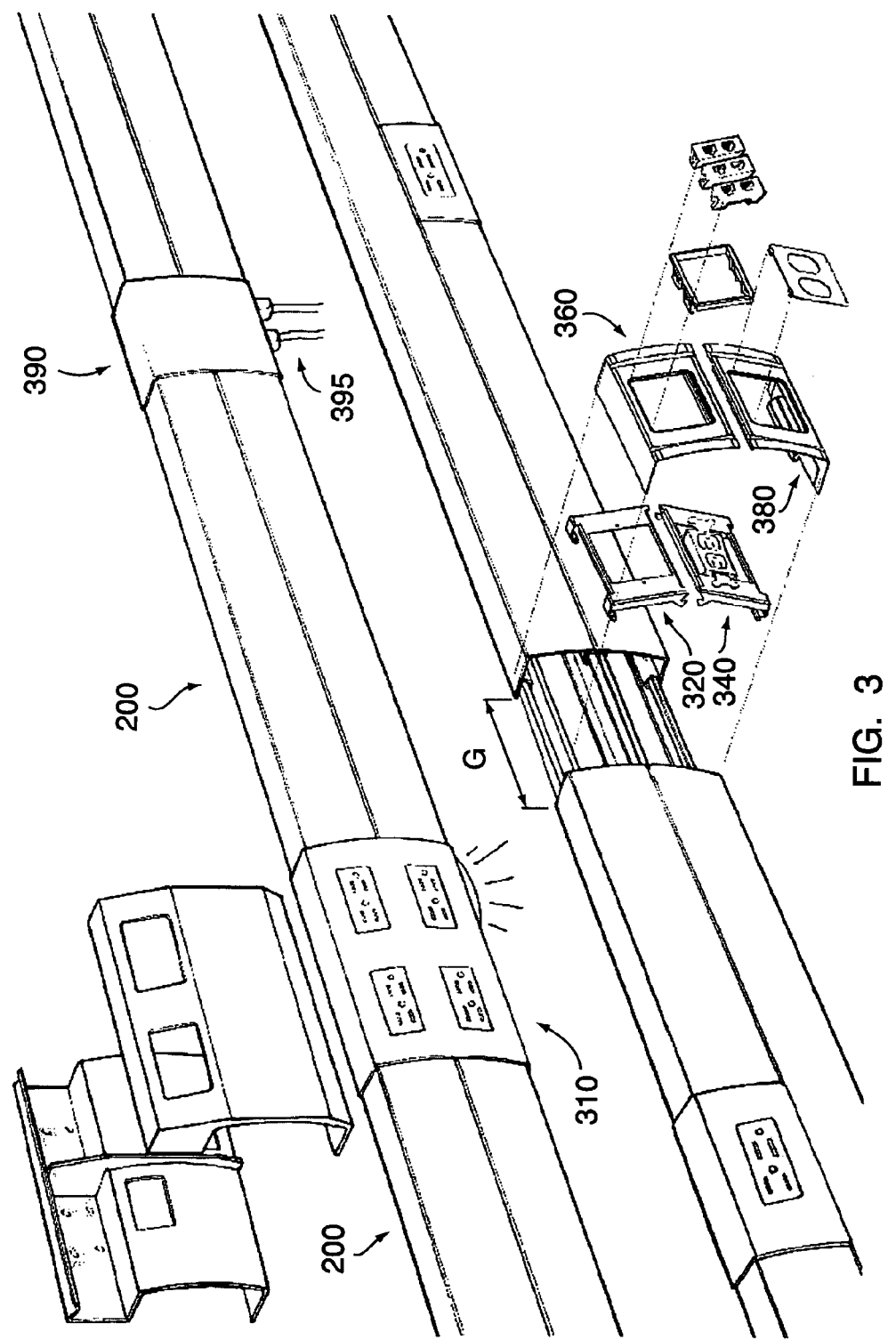
FIG. 3 illustrates the raceway components of the present invention taking advantage of the downwardly open receptacles in the lower raceway, as well as the staggered mounting for outlet devices in the upper and lower raceway covers. Also shown in FIG. 3 is an alternative arrangement where the outlet devices are clustered at a single location in the raceway. This alternative embodiment illustrates a raised device box to provide additional through-put for the cabling in the wireways defined by the raceway base and cover in accordance with the present invention.
Figure 5:
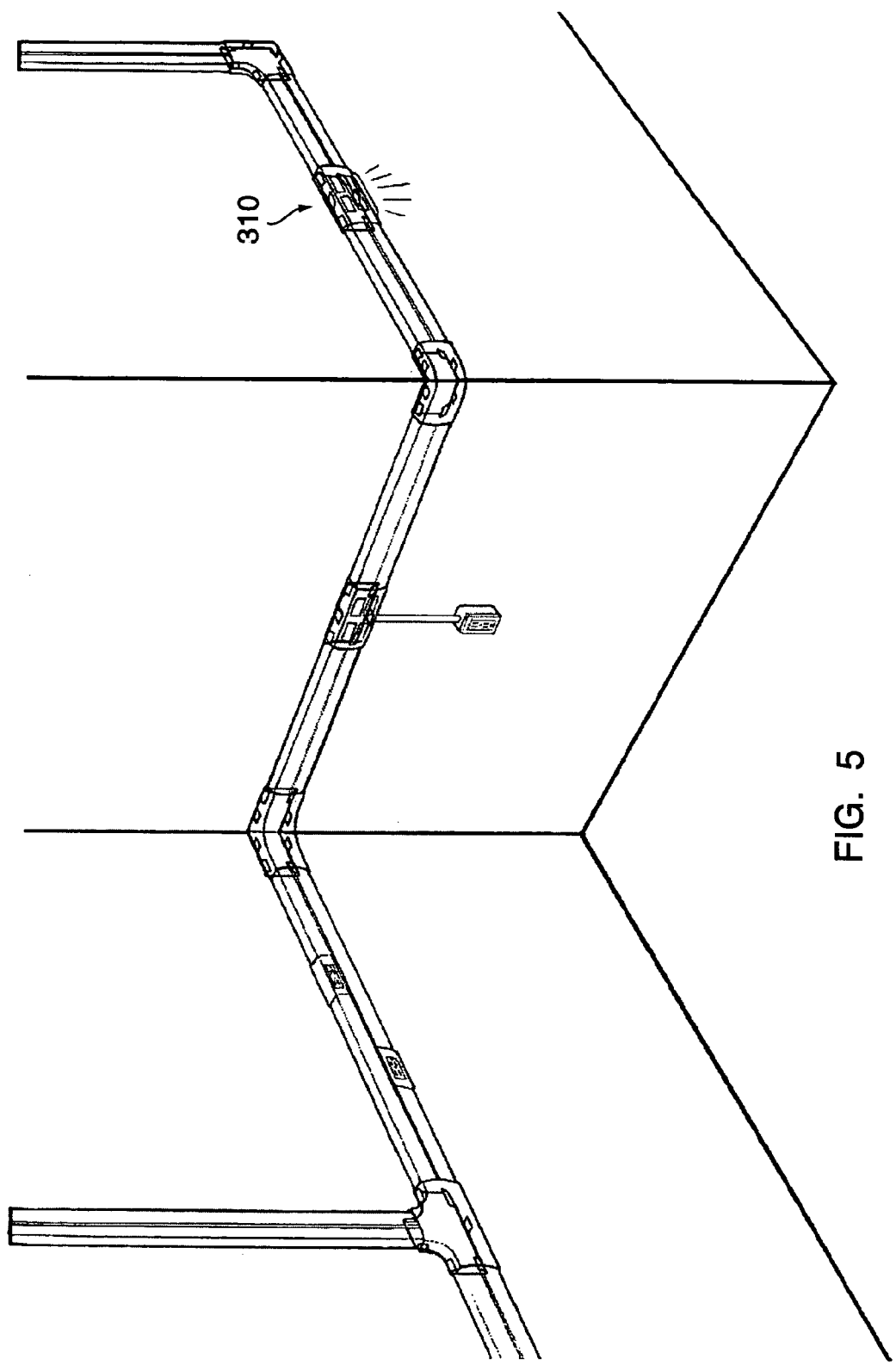
FIG. 5 is an assembly view illustrating the use of modular raceway in accordance with the present invention in a particular installation and illustrates the various internal and external elbows, T-shapes, and flat elbow configurations necessary to provide a complete installation in a particular building environment.
Figure 6:
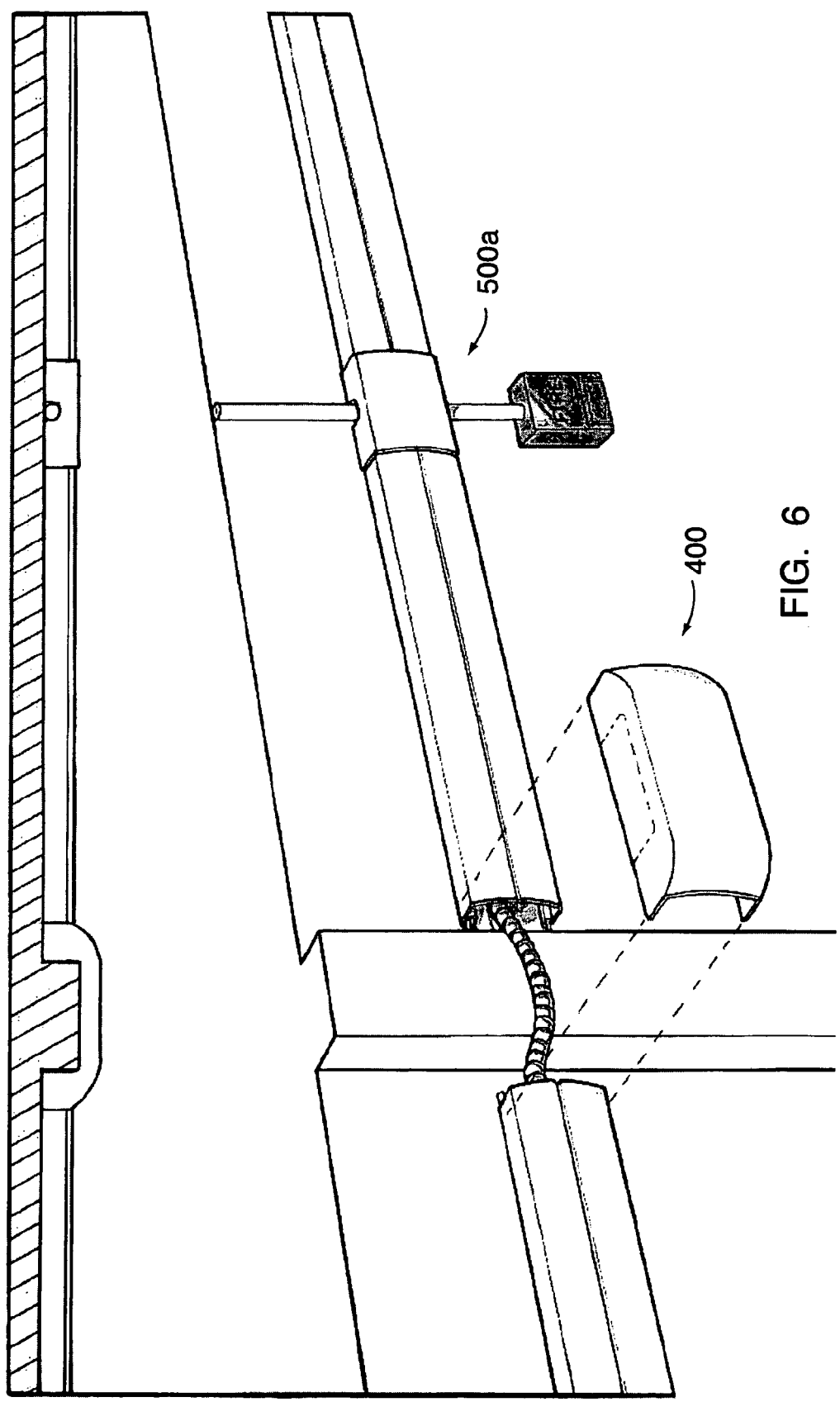
FIG. 6 shows another alternative installation for running raceway of the present invention around an obstacle or column, and/or around an existing conduit or other smaller obstacle in the path of the raceway.

A feature of the present invention is that the raceway assemblies 200, 200 are of standard length (L) preferably between 4-8 feet, and are prewired. Thus, these raceway assemblies can be assembled with these mounting brackets so as to leave a gap G between the end portions thereof. The internal wiring for each raceway assembly can be filled with connectors (not shown) or conventionally connected by wire nuts or the equivalent. The gap G can be closed by a short raceway slip cover member 300, which is of U-shape, and has an internal contour to fit over the external contour of the raceway covers in the assemblies 200, 200, and to overlap these assemblies as shown in FIG. 3 for example. Alternatively, the gap G in the raceway assemblies 200, 200 can be used to provide an obstacle clearance component such as shown at 400 and 500 in FIG. 6. More generally, this gap G can be utilized to accommodate T-fittings, outlet device brackets and slips covers, internal and external elbows, and flat elbows, all as shown in FIG. 5.

Figure 7:
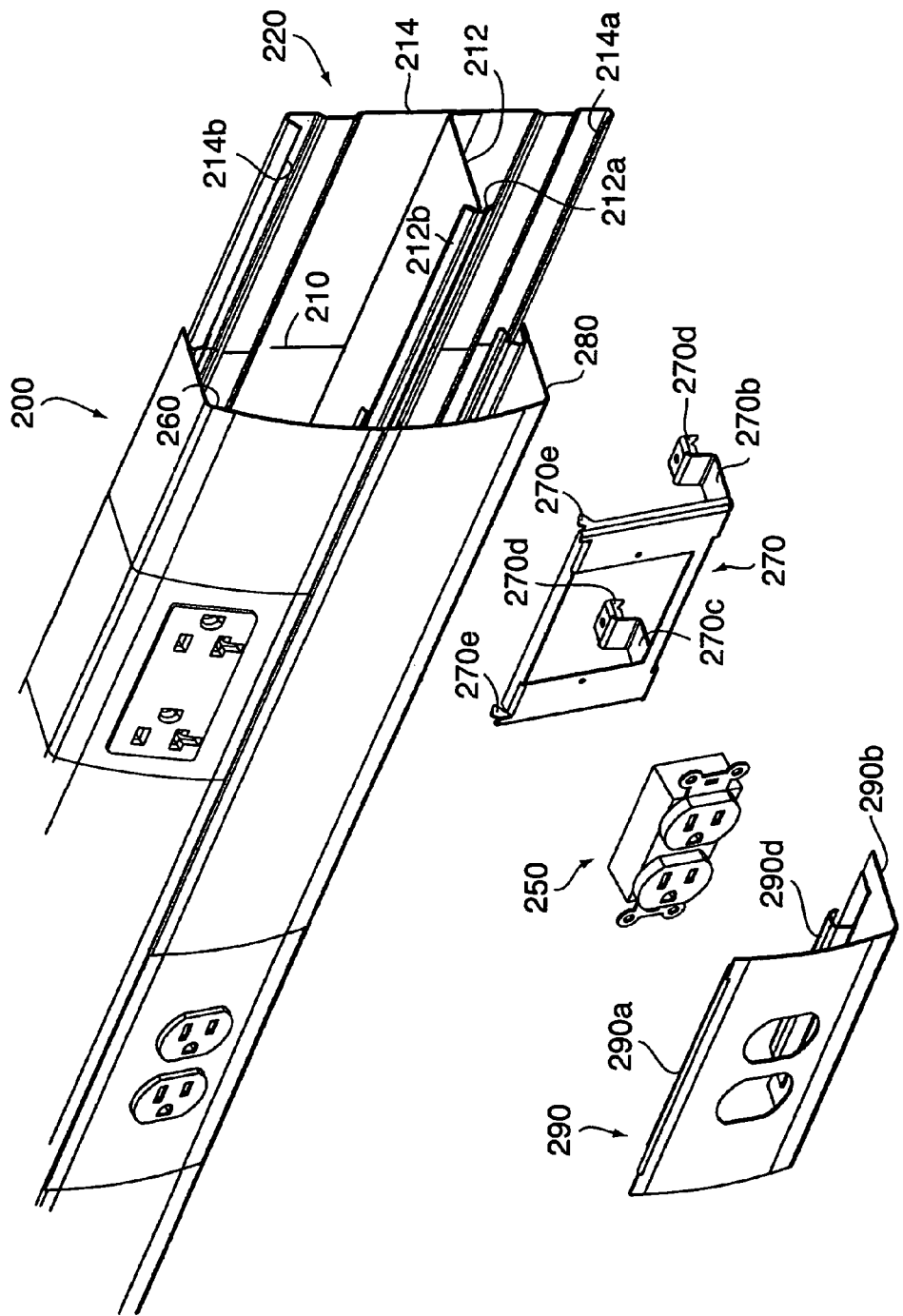
FIG. 7 shows in exploded relationship the various components required to install outlet device brackets in the lower wireway of a raceway in accordance with the present invention.

The raceway assemblies 200, 200 comprise a T-shaped base component such as shown at 220 in FIG. 7, plus two raceway cover components 260 and 280, each being of L-shape and snapped into the base 220 as suggested in FIG. 7. This configuration allows outlet devices to be placed at any location in the raceway assembly, and in either one or both of the upper and lower covers. FIG. 7 shows one outlet device for assembly in the front wall of the lower wireway between spaced apart raceway cover components (one shown at 280).

Figure 1:
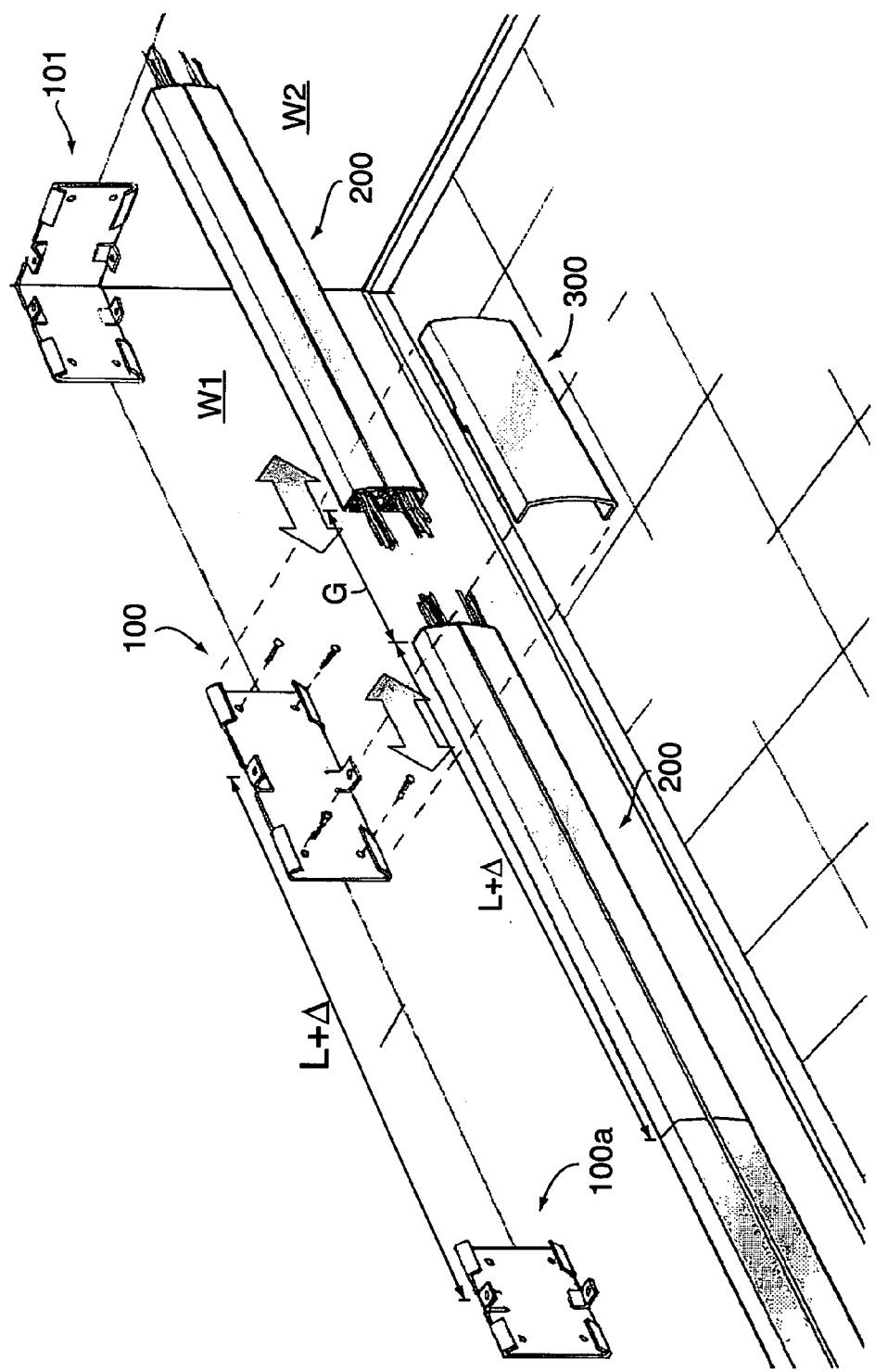
FIG. 1 is an exploded perspective view showing the various components of a first embodiment of the present invention relative to a wall structure.
Figure 2:
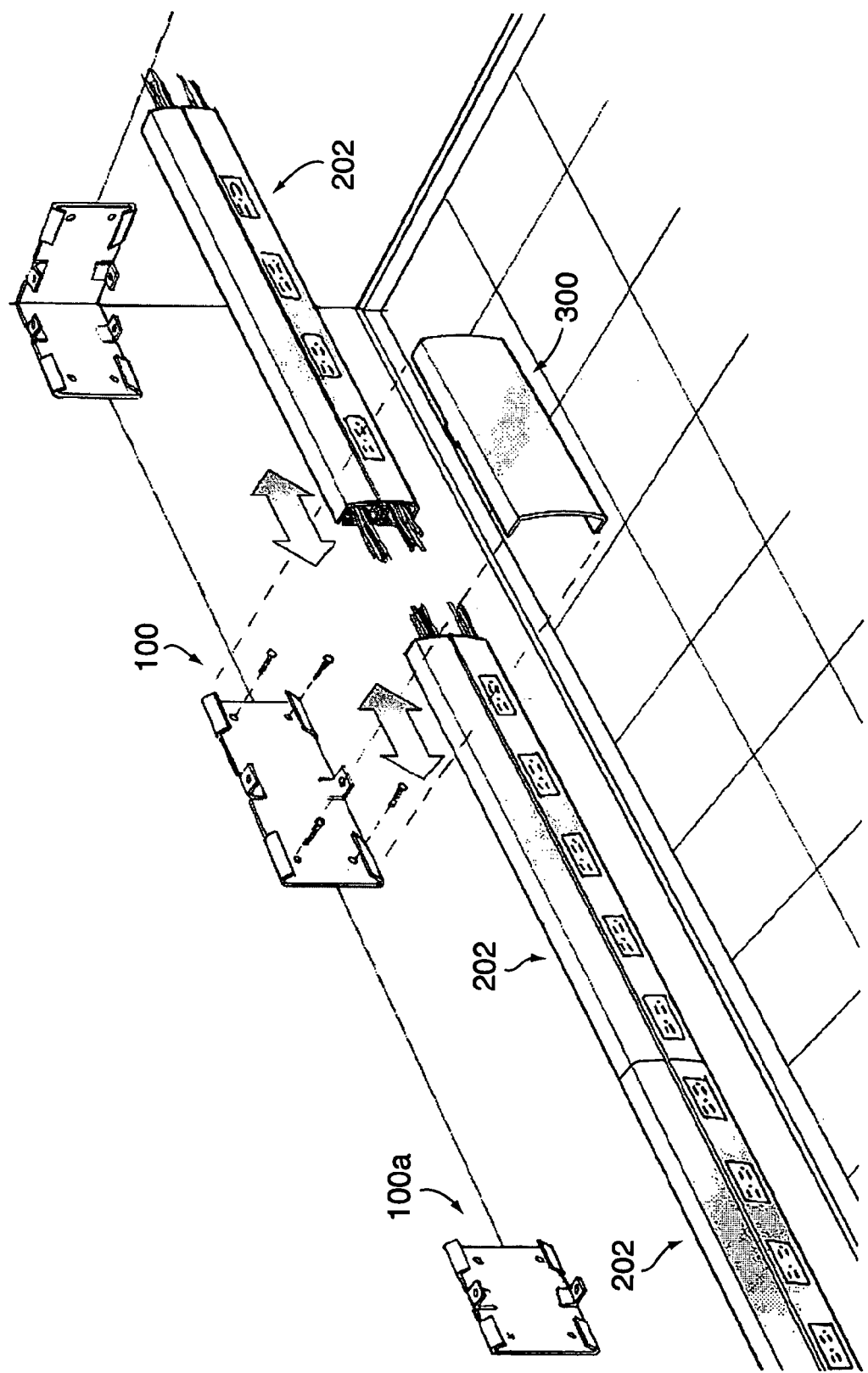
FIG. 2 is an exploded view of the components of the present invention as adapted for use in a modular raceway system that not only includes preassembled cables in the various raceway sections, but also including prewired electrical outlet devices in the lower raceway.
Figure 24:
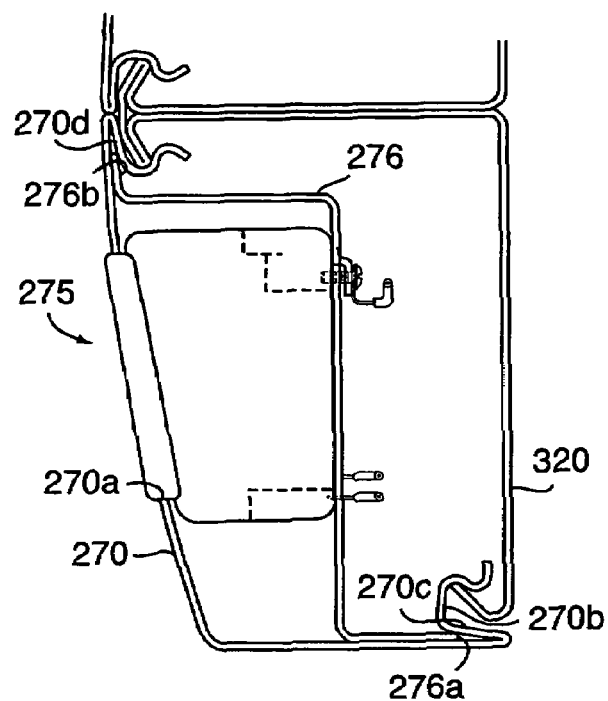
FIGS. 24-26 show a raceway cover component, such as described above, having an L-shape and mounted on a raceway base to and from a wireway. The cover has cutouts to receive additional plugs similar to those sold by The Wiremold Company.
Figure 25:
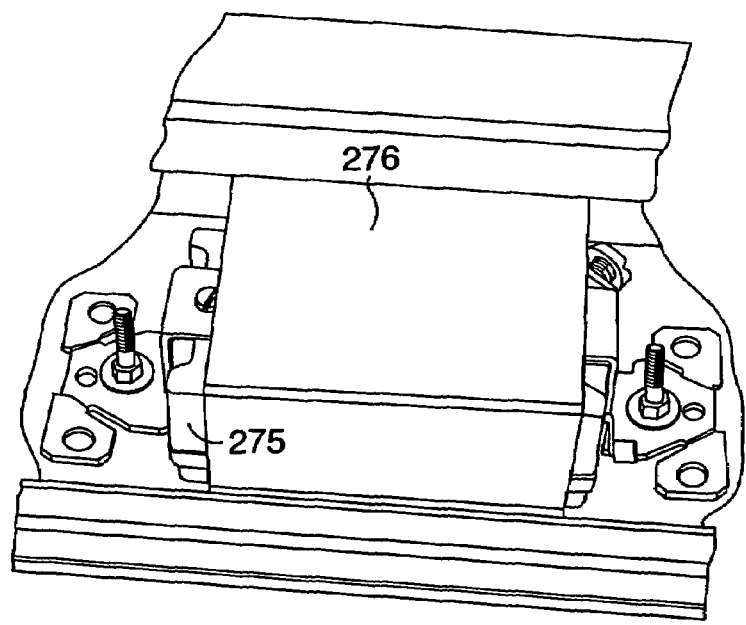
Figure 26:

FIG. 2 shows the same components as depicted in FIG. 1 except that the raceway assemblies 202 are not only prewired, but are also fitted with prewired outlet devices. Prewired raceway of this type is available, but not in with an L-shaped cover used with a T-shaped raceway base to achieve the results set forth herein. FIGS. 24-26 show this assembly in greater detail and will be described in greater detail below.

Turning next to a detailed description of FIG. 3, various configurations for mounting outlet devices are illustrated for use with a raceway assembly constructed in accordance with the present invention. For example in the gap G between adjacent raceway assemblies 200, 200 an assembly similar to that shown at 310 in FIG. 5 can be installed providing a multitude of outlet devices, including a "down light". As a result of the unique L-shaped configuration for the raceway covers, it is possible to provide outlets in the downwardly facing side wall of the lower raceway cover.

Individual device brackets for both the upper and lower wireways defined in the raceway of the present invention are indicated generally at 320 and 340 in FIG. 3 each being designed to accommodate a device such as an outlet plug. A cover or half cover is provided for each of these device brackets, and the upper cover may include a frame to accommodate data ports while the lower half cover may include a snap in outlet device plate or the outlet device plate can be provided in one piece with the half cover as described hereafter.

Still with reference to FIG. 3, and in locations where the adjacent raceway assembly end portions abut, so as to provide a continuous back plane for the raceway in a manner to be described, a somewhat shorter raceway coupling slip cover 390 can be fitted as shown. Furthermore, the opportunity for providing downwardly facing outlet devices permits power cabling such as indicated at 395 to be hidden from view and to be protected from the environment. This location for outlet plugs provides power leads 395 in a protected area below the raceway, and between the raceway and the floor.

Figure 4:
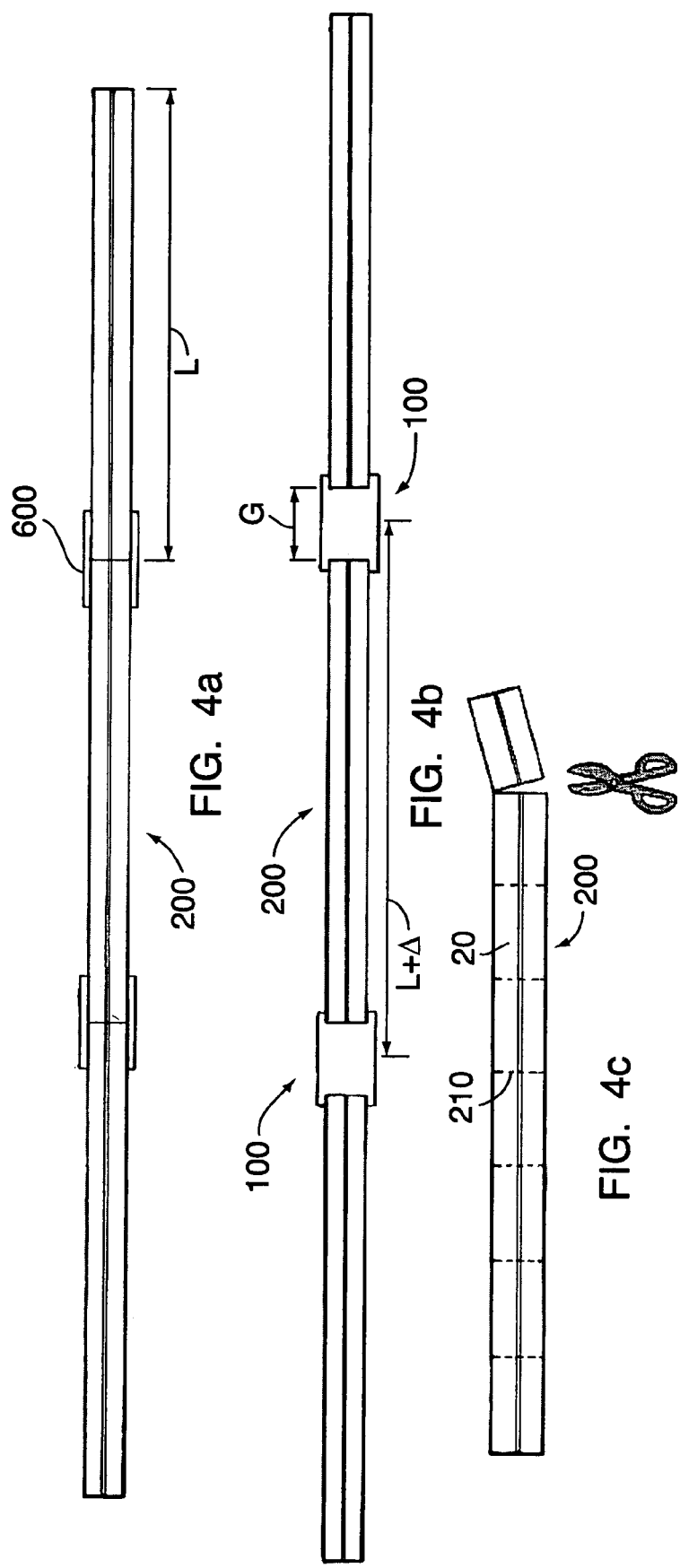
FIG. 4 shows in several schematic views the advantage to providing predetermined length raceway base sections together with brackets for supporting these raceway base sections, to mount on a wall structure of varying length, yet with the same raceway components. This view also illustrates the lines of weakening provided in the raceway base to achieve somewhat shorter raceway sections for wall lengths that require less than these "minimum length" raceway sections.

FIG. 4 illustrates the flexibility of raceway assemblies constructed in accordance with the present invention, and shows in somewhat schematic fashion the support brackets 100 together with aligned raceway assemblies 200, 200 that in the top view are shown in abutting relationship, and in the middle view in spread relationship so as to provide a gap G between the end portions of the adjacent aligned raceway assemblies 200. The bottom view in FIG. 4 illustrates a feature of the raceway base of the present invention whereby lines of weakening 210, 210 are provided incrementally along the length L of the raceway base. As a result of this configuration three standard length (L) raceway segments 200, 200, of eight foot in length for example, can be used to accommodate either a 24 foot span of wall, or can be expanded to provide an extra one foot four inches along the wall as a result of the gaps G provided between each of the raceway assemblies. The scoring of the eight foot raceway sections in predetermined increments allows even more variation in the overall raceway length that can be accommodated with a minimum of installation effort.

In a preferred embodiment, to be described with reference to FIG. 16*a* these lines of weakening are only 4 inches apart as shown at "X". A more convenient fit to the convention stud spacing (16 inches or 24 inches) in conventional wall structures can be achieved with the prepunched base plate mounting holes 209, 209 spaced 2 inches from every other line of weakening "X/2" providing a mounting hole spacing of "2X". The same spacing "2X" is provided between the knock-out openings in the web portion of the T-shaped base as shown in FIG. 16*a*. Finally, the slip covers, 300 for example, are preferably half again as long as the spacing X, or 1.5 times X (6 inches for the preferred 4 inches spacing if the lines of weakening 210, 210 in the preferred embodiment.

It is noted here that installers of present day raceway must use precision cutting tools that are designed to sever a rather heavy gage steel raceway base, that is generally of U-shape. Often times the cut is not square, or otherwise of sufficient precision to satisfy either UL requirements, or the installer/customer's needs.

Although present day covers for use with conventional U-shaped raceway base configurations can be conveniently cut because they are flat, the flanges on the back side of the these covers can lead the installer to uneven cuts, resulting in an imperfect raceway installation. Even the untrained eye can be expected to pickup defects such as these. The present invention effectively obviates or at least minimizes the opportunity for such imperfections.

The purpose then of the present invention is to provide a unique raceway system that is not only of modular construction as mentioned above, but that also includes a raceway base which is provided with conveniently located lines of weakening 210 as described above with reference FIG. 4. Such a raceway system leads to greater flexibility in the location of outlet devices in the one wireway associated with the power leads, and in the adjacent wireway associated with the data/telecom cabling. See for example in FIG. 3 where the "activations" for both power and data can be accommodated "anywhere" along the length of the individual wireways rather than requiring all "activations" to be provided in an oversized multipurpose installation such as illustrated at 310 in FIG. 3. Such an installation is possible in the present raceway system.

Turning next to FIG. 7, and in accordance with the present invention, a modular raceway system of the present invention comprises elongated raceway base plates 220 having the lines of weakening such as indicated generally at 210 in FIG. 7. Each base plate includes a forwardly projecting web portion 212 formed integrally with the back plate 214, either by spot welding or in the event the material is suitable by extrusion. This T-shaped base configuration gives rise to advantages not available in more conventionally shaped raceway base structures. As mentioned above, 4 inches spacing of these lines of weakening 210, 210 is preferred. Prepunched holes 2 inches from these lines of weakening also contributes to efficiency during installation.

In prior art raceways, of the type made from rolled steel for example, the raceway covers span the opening defined by a U-shaped base. See for example the two piece steel raceway available from The Wiremold Company of West Hartford, Conn. under their 6000 and 4000 style two piece metal raceway. The present invention on the other hand provides a raceway base plate that is of T-shape cross section such that the forwardly projecting web portion defines a divider 212 between two adjacent wireways, that are further defined by separate wireway covers 260, 280. This configuration allows these raceway covers 260 and 280 to be preassembled, or separately assembled with the raceway base 214, and consequently provides opportunity for the placement of outlet devices in staggered locations along the raceway as suggested in FIG. 7. Installing individual outlet devices, in one or the other of these separate wireways provides an advantage over the prior art two piece metal raceways.

Still with reference to FIG. 7, the covers 260 and 280 are preferably identically configured, and the corresponding wireways also of equal cross-sectional area or volume. The lower raceway cover 280 is shown to be coextensive in length with that of the upper raceway cover 260 in FIG. 7, but this equivalency is not required. Each cover component can be of any length. Thus, individual outlet devices associated with each of these raceways can be provided in staggered relationship along each wireway so the raceway assembly can take a variation of forms as shown in FIG. 3 and FIG. 7.

Turning now to a more detailed description of the several ways in which outlet devices can be mounted in the raceway assembly, L-shaped device bracket 270 is shown in FIG. 7, and includes an opening 270*a* for receiving an outlet device, such as indicated generally at 250. The L-shaped device bracket 270 includes rearwardly extending lower portions 270*b* and 270*c*, which have spaced apart end portions 270*d* that are identically formed so as to be received on the angled flange 214*a* that extends the full length of the raceway base 214. These socket defining portions 270*d* of the L-shaped device bracket 270 are received by the flange 214*a* and allow the installer to pivot or snap the device bracket 270 in place, and in assembled relationship with the downturned lip 212*a* of the divider 212 on the raceway base. The device bracket 270 also has inwardly bent flanges that define end portions 270*e*, 270*e* provided specifically for this purpose.

It will be apparent that the L-shaped device bracket 270 can be configured to receive outlet devices such as that shown at 250. Outlet devices of different configuration, as for example data/communication jacks, can also be provided in the device bracket 270, and mounted in the upper wireway defined between the raceway base 214 and cover 260. A downwardly inclined flange 214b on the raceway base 214 cooperates with the upturned flange 212b on the divider wall 212 for this purpose. Since both wireways are preferably identical, the same device bracket 270 can be assembled in both the upper wireway, and the lower wireway.

Still with reference to FIG. 7, a cover plate 290 is adapted to fit over the outlet device 250 and is fitted to the raceway itself even as does the device bracket. This cover plate overlaps the cover segments 260/280. The cover plate 290 like the device bracket 270 is also of L-shape, and includes a rearwardly projecting wall 290b, having a socket shaped end portion or flange 290d, which is adapted to engage the aforementioned flange 214a of the raceway base. The flange 290a fits between the socket portions 270d, 270d on the device bracket 270. As so constructed and arranged the cover plate 290 can be assembled over the device bracket by providing this socket flange 290d in the space between the leg portions 270b, 270c of the device bracket, and pivoting the cover 290 in place over the outlet device 250. The upper marginal edge 290a is so constructed as to be received between the portions 270e of the device bracket as assembled with the base flange 212a. A secure assembly is provided for the outlet device 250. Steel material is preferably selected for fabrication of the raceway base and covers and provides continuity or grounding throughout the assembly of a raceway constructed in accordance with the present invention. So too the device bracket 270 is also fabricated from an electrically conductive metal material.

Figure 8:
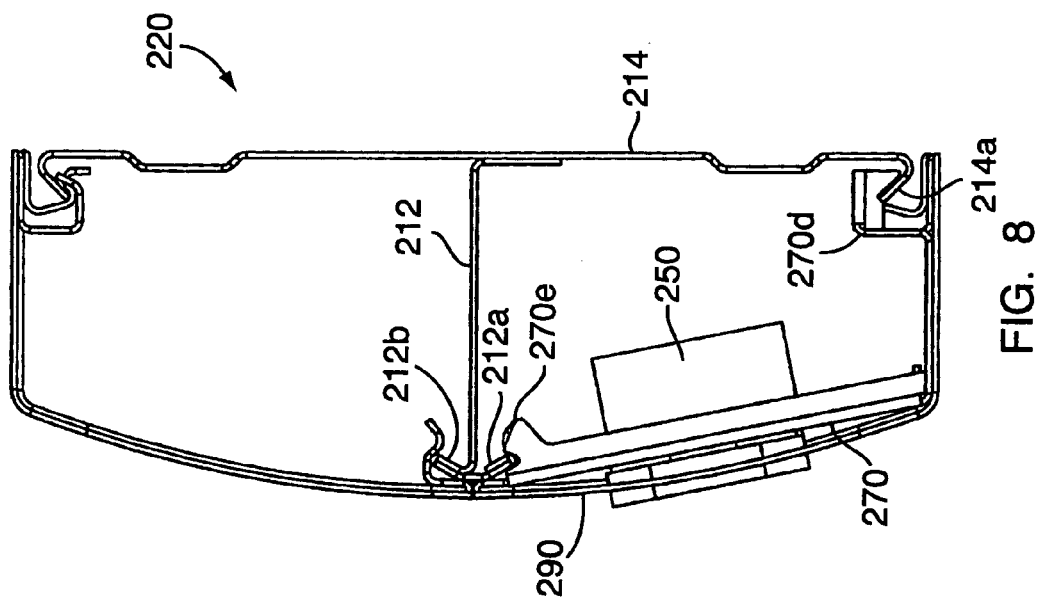
FIG. 8 shows in cross section the assembly of the components illustrated in FIG. 7.

FIG. 8 shows in cross-section the assembly described in the proceeding paragraphs, and illustrates the interlocking arrangement provided for between the raceway base flange 214a and the socket defining end portions of the rearwardly projecting legs 270d of the device bracket. Also shown in FIG. 8 is the rearwardly projecting portion 270e of the device bracket which cooperates with the angled marginal edge 212a of the divider 212. The bracket cover 290 has openings, best shown on FIG. 7, for receiving the outlet device 250. The outlet device itself maybe secured to the device bracket 270, preferably by conventional screw fasteners (not shown).

Figure 9:
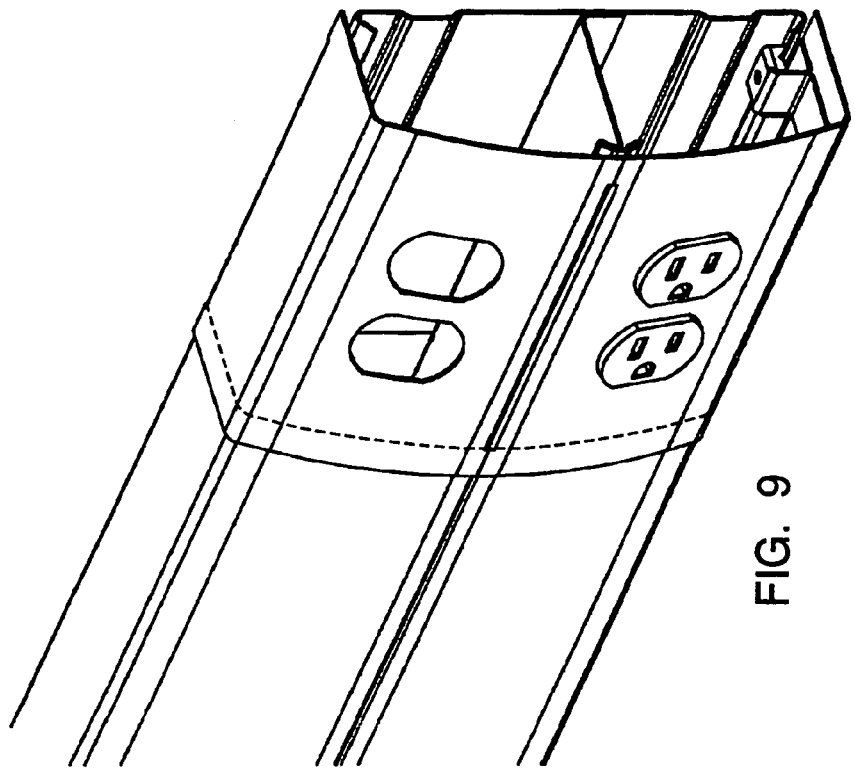
FIG. 9 shows in perspective view the assembled components of FIG. 8.

Although the staggered relationship between the devices in the upper and lower wireways illustrated in FIG. 7 is an advantage of the present invention, it will be apparent from FIGS. 7, 8 and 9 that outlet devices can be stacked one above the other in a conventional configuration. Thus, the raceway system of the present invention has all of the advantages of prior art systems, and has added advantages over prior art raceway systems.

Figure 10:
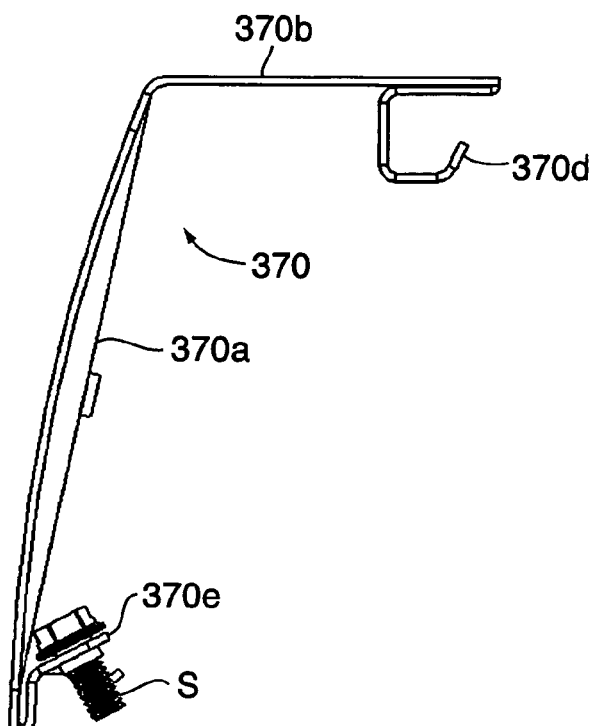
FIG. 10 is an end view of an L-shaped device bracket for assembly with the T-shaped base between aligned cover components associated with the top or upper wireway.
Figure 11:
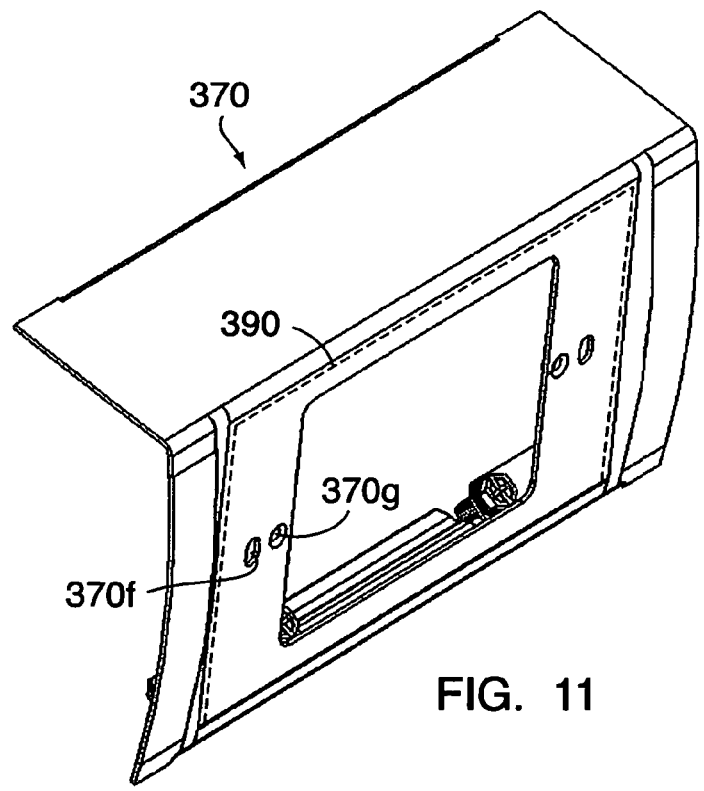
FIG. 11 is a top perspective view of the device bracket shown in FIG. 10.
Figure 12:
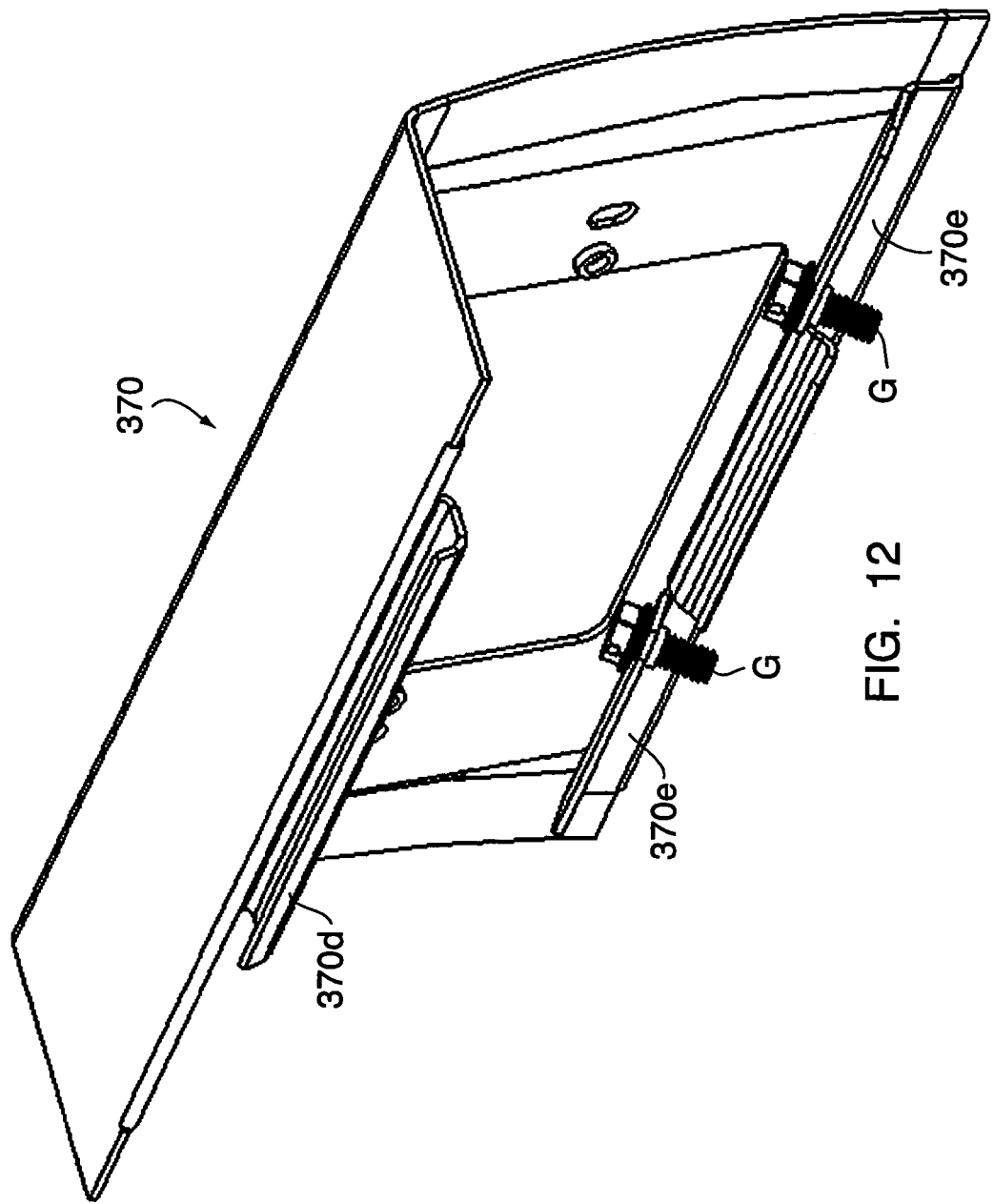
FIG. 12 is a rear perspective view of the device bracket of FIGS. 10 and 11.

FIGS. 10, 11 and 12 illustrate a device bracket 370 of slightly different geometry. The device bracket 370 is designed to accommodate a more conventional cover plate 390. The rectangularly shaped conventional, cover plate 390 characteristic of present day outlet device cover plates generally, can be fastened to the device bracket 370 as suggested by the broken lines of FIG. 11. As shown in FIG. 10, the device bracket 370 has a socket defining portion 370d formed on the inner top side of the L-shaped bracket and this side 370b is oriented at an angle so as to form the L-shape with respect to the device bracket wall 370a, that will accommodate the outlet device itself.

FIG. 11 illustrates the device bracket 370 of FIG. 10 in a front top perspective view, with the outline of a conventional cover plate 390 being illustrated in broken lines to show how the device bracket 370 accommodates both the outlet device and the conventional cover plate. Suitable openings are provided adjacent to the outlet device opening in the device plate 370 for receiving both the screws associated with a conventional outlet plug, and other style cover plates associated with raceways of non-metal.

Still with reference to the device bracket 370 of FIG. 12, illustrates the shortened socket portion 370d of the device bracket 370 which engages the downturned flange portion 212a of the divider 212 in the base 214 of the raceway. A rearwardly projecting flange 370e provided on the lower edge of the device bracket of FIG. 12 engagements the flange 214 on the marginal edge of the web of the raceway base. Grounding screws S, S are provided to securely anchor the device bracket 370 in place, and to serve as a continuity or grounding connection as between the device bracket 370 and the raceway cover of the raceway assembly.

Figure 13:
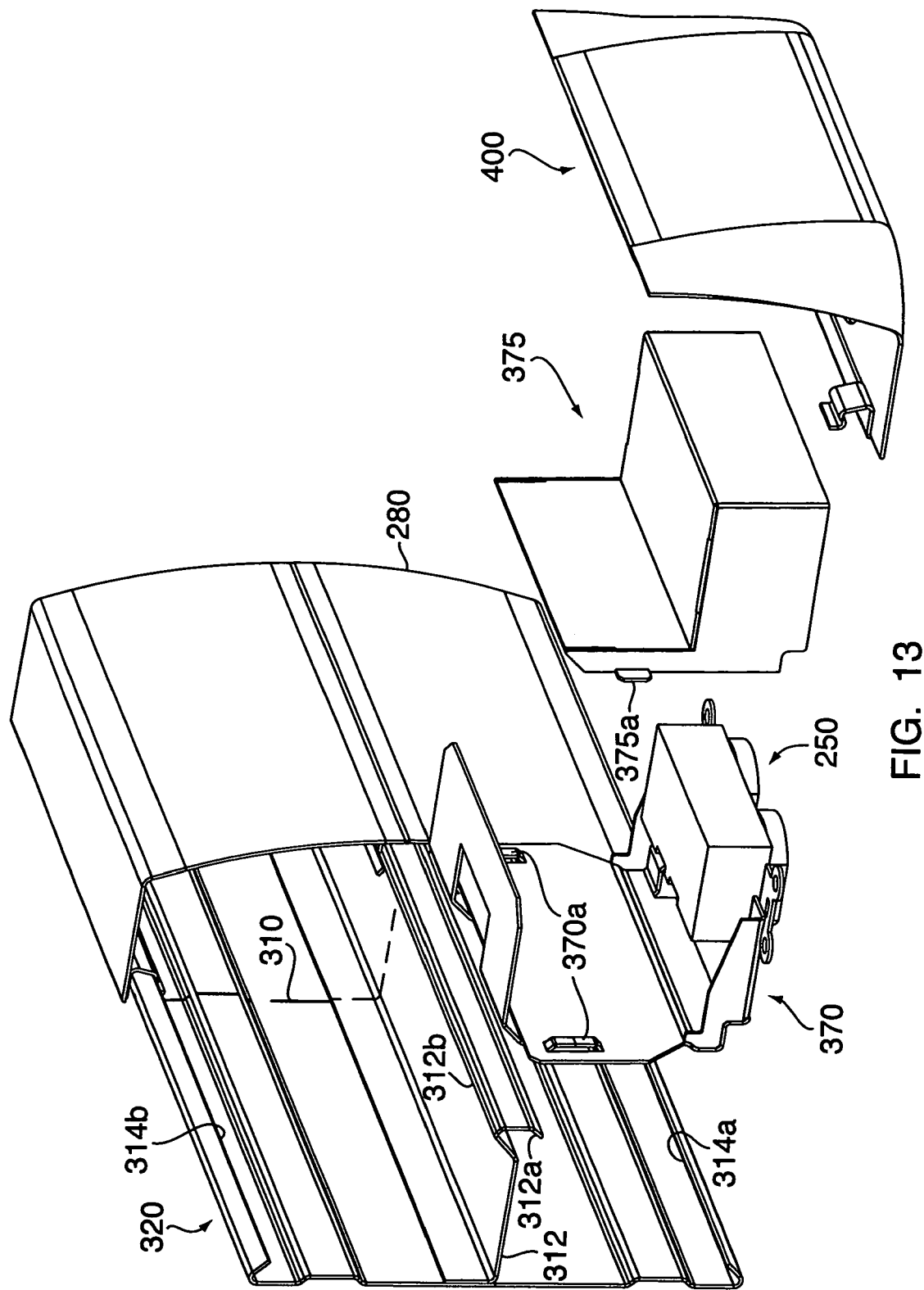
FIG. 13 is an exploded perspective view of an alternative design for a device bracket with a downwardly facing outlet device and enclosure and escutcheon components for assembly therewith.
Figure 14:
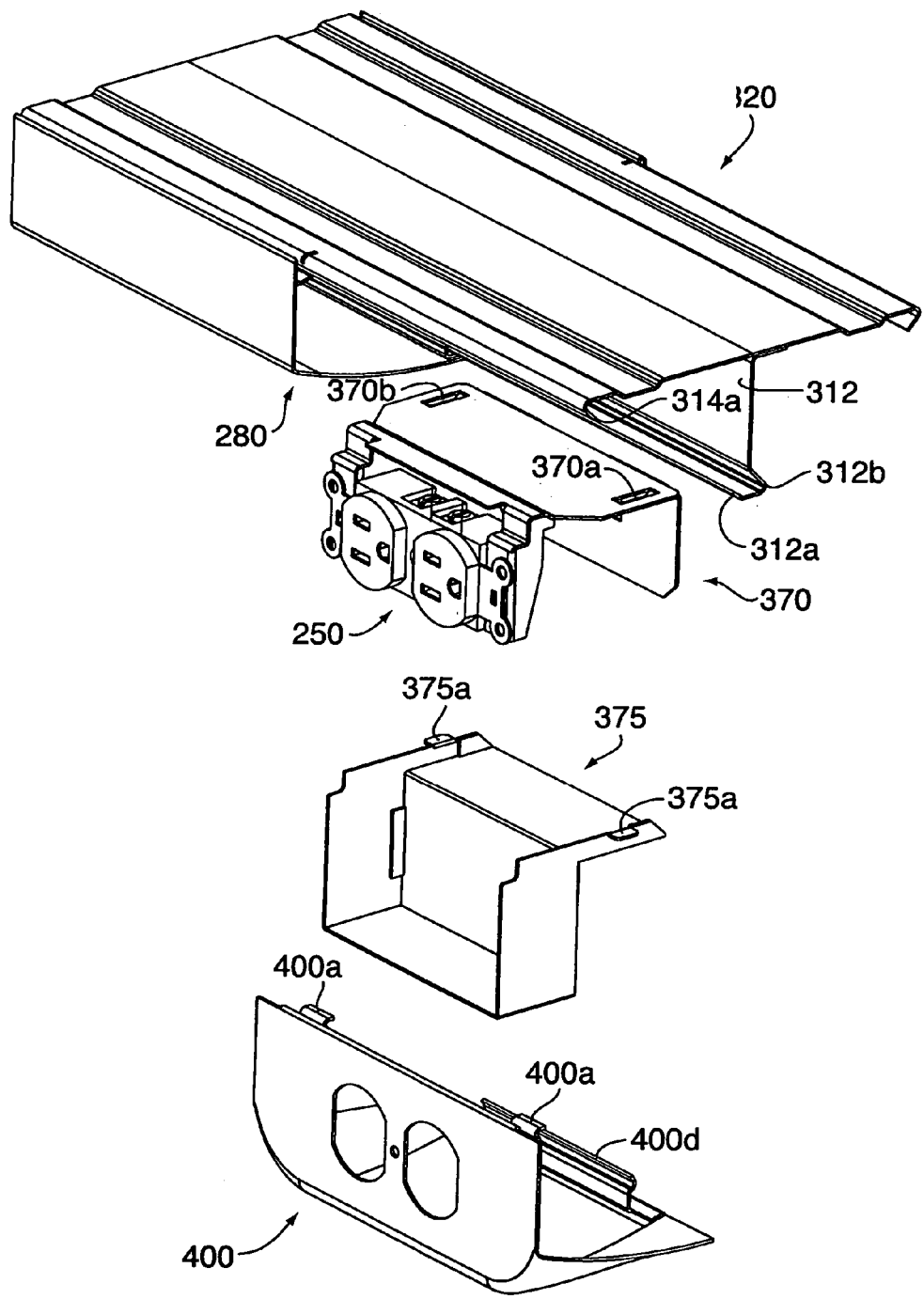
FIG. 14 is an exploded rear quartering perspective view of the device bracket and associated components.
Figure 15:
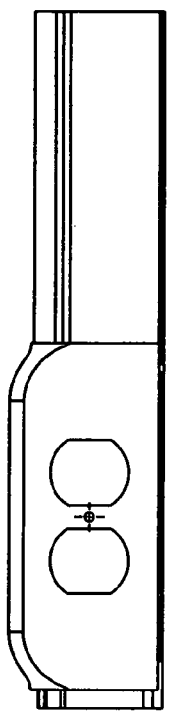
FIG. 15 is a bottom view of the assembled components from FIGS. 13 and 14.

FIGS. 13, 14 and 15 show still another version of outlet device bracket, one that also allows the device to be mounted between raceway cover components in the raceway assembly in order to provide the outlet plug at a location that does not detract from the overall appearance of the raceway assembly itself. More particularly, the device bracket 250 is so mounted that the outlet device faces downwardly, affording the opportunity to hide both the outlet plugs itself from view, and to make the wires from and to that plug much less noticeable than is the case with present day outlet device equipped raceway of the surface or wall mounted type.

FIG. 13 also shows a slightly modified configuration for the divider 312 in the raceway base 320, the raceway base being otherwise similar to that described previously, and having marginal edges 314a and 314b defined along the marginal edges of the base, and having angled portions 312a and 312b defined along the free end portion of the web or divider 312. Thus, the raceway base 320 is quite similar to that described previously with reference to the raceway base 220 and preferably includes lines of weakening such as shown at 310 in FIG. 13 and mounting holes (not shown). It will be apparent that device brackets of the type described previously with reference to FIG. 7 and FIGS. 10-12 inclusively can also be used with this alternative raceway base plate 320 of FIG. 13.

In order to take advantage of a downwardly facing outlet plug 250 such as shown in FIG. 13. A unique configuration is provided for the device bracket. The device bracket 370 of FIG. 13 is shown in exploded relationship to the raceway base, whereas in FIG. 15 the device bracket is shown in a assembled relationship with the raceway base, and with a raceway cover is also shown assembled with that raceway base in FIG. 15.

With reference to FIG. 13, the device bracket 370 can be seen to have a generally U-shaped configuration, the lower legs of the U being spaced apart to receive the outlet device 250. The upper legs of the U are oriented parallel to these lower legs, and are provided alongside the divider 312. The outlet device 250 and it's device bracket 370 are isolated from the lower wireway by a retaining box 375 mounted on the device bracket 370. These components are held in assembled relationship by the ears 375a on box 375 that cooperate with slots 370a in the device bracket for this purpose. Retaining box 375 not only affords protection for the connections made with the outlet plug 250 at assembly, but also serves to define a protective passageway that will accommodate wiring running through the lower wireway in the raceway assembly.

FIG. 14 shows these components from below, as adapted to be assembled with the raceway base 320 to be provided between spaced raceway covers 280. The cover plate 400 serves as an escutcheon plate for the downwardly facing outlet plug 250. The socket portions 400a and 400d, provided at the ends of the L-shaped cover 400 allow snap-in assembly of the cover 400. More particularly these socket portions fit onto the flanges 312a and 314a of the base 312. The cover plate 400 is designed to accommodate the outlet device 250, but other configurations (not shown) can be fabricated to accommodate other types of electrical devices, such as jacks or down lights as shown in FIG. 5.

By way of summary and with reference to FIGS. 13, 14 and 15, it will be apparent that raceway assemblies fitted with an outlet device plate in the downwardly facing wall of the raceway present an architecturally pleasing raceway appearance as this configuration obscures the outlet plug from view. Thus, the eye of the observer does not pick up such locations for the outlet plugs as readily as with conventional raceways generally. Further, the electrical cords that will be later plugged into such downwardly facing outlets located in the lower wall of the raceway are also obscured from view giving rise to an improved appearance for the space serviced the raceway of the present invention, as compared to conventional raceways generally.

In addition this configuration puts the plug in a more protected environment. Whereas conventional present day raceways include a base component of generally U-shape with vertically spaced top and bottom boundaries or walls formed integrally with a generally flat base which is mounted to the wall, the provision for outlet devices in that lower wall is virtually precluded, or at least rendered difficult, by virtue of the fact that the wall is integral with the base. In the T-shaped raceway base plate of the present invention, on the other hand no bottom wall is required, and the bottom wall of the raceway is instead defined by the cover, leading to greater flexibility for locating outlet devices. More particularly, the cover's L-shape cross section affords opportunity for mounting downwardly facing device brackets, and brackets for other purposes such as lights, without requiring any cutting away of the raceway base. Therefore, the raceway design of the present invention affords not only a more aesthetically pleasing appearance to the observer, but also provides for functional advantages not readily available with raceway configurations currently available.

As previously described with reference to FIG. 4, raceway mounting plates can be provided at spaced intervals along a wall and preassembled raceway assemblies of predetermined length can be secured to these mounting plates to leave a gap between the adjacent end portions of the aligned raceway base plates. Thus, these mounting plates serve as coupling means to provide a continuation of the rear boundary of the upper and lower wireways so that the wireways need not be defined by the wall, but as instead defined by the metal covers and these metal mounting plates at least in the areas of these gaps. As mentioned previously, the lines of weakening in the raceway base plates facilitates the installation process in that the precise cutting of the raceway base (required with present day U-shaped two piece metal raceway generally) is rendered unnecessary, and the installer can instead make rough cuts or simply break apart the raceway base at a line of weakening.

Figure 16:
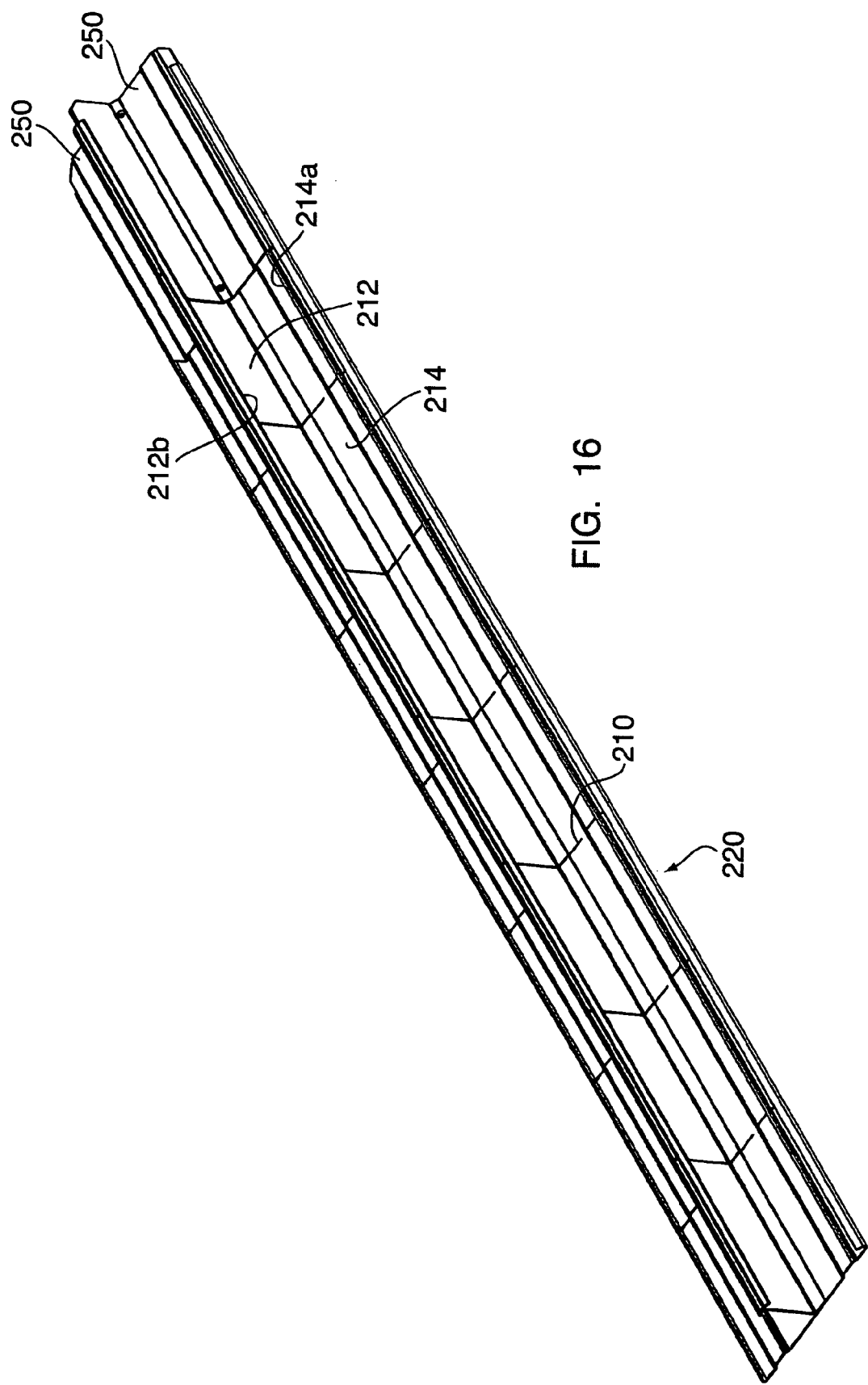
FIG. 16 shows a T-shaped raceway base 200 having an integrally formed divider, and the same lines of weakening provided at predetermined intervals. Raceway covers (not shown) can be shaped into assembly with the base as described above. To join aligned raceway base components to one another at installation, couplers 250, 250 are shaped into the wireway defining walls of the T-shaped base as shown in FIG. 14 which shows the couplers 250, 250 secured into the raceway base 200. Note the openings 250a, 250a for receiving screw fasteners (not shown) but similar to those shown in reference to FIG. 10 at 5, 5. Covers 260 and 280 cooperate with the T-shaped base 220 to define separate wireways for the power and data/communication cables.

It is also a feature of the present invention that these raceway base plate components can be assembled directly to the wall without requiring mounting plates. In order to provide another form of coupling means, to form a continuation of the metal back plane for the wireways defined by these aligned L-shaped raceway base components the present invention contemplates individual coupling wireway elements, in the form of the couplings shown at 250, 250 in FIG. 16. FIG. 16 shows a raceway base plate 220 of T-shape cross section having a plurality of score lines 210, 210 in the manner described previously with reference to FIG. 4. In lieu of the mounting plates shown in FIG. 4, coupling means, in the form of elements 250, 250 are snapped into place between the projecting T-shaped web 212 and the rear wall 214 of the raceway base 220. More particularly, the marginal edges of each coupling member or element 250 is received between the lip 212b at the free end portion of the web 212, and the longitudinally extending marginal edge 214a of the back portion of the raceway base. See FIG. 16 for details on the preferred form for the T-shaped raceway 225. Note the spacing X between the lines of weakening, and that between the knock out openings 2X and mounting holes 2X. X is preferably a division of 16 and 24 and 4 inches has been found to be a suitable spacing X.

Figure 17:
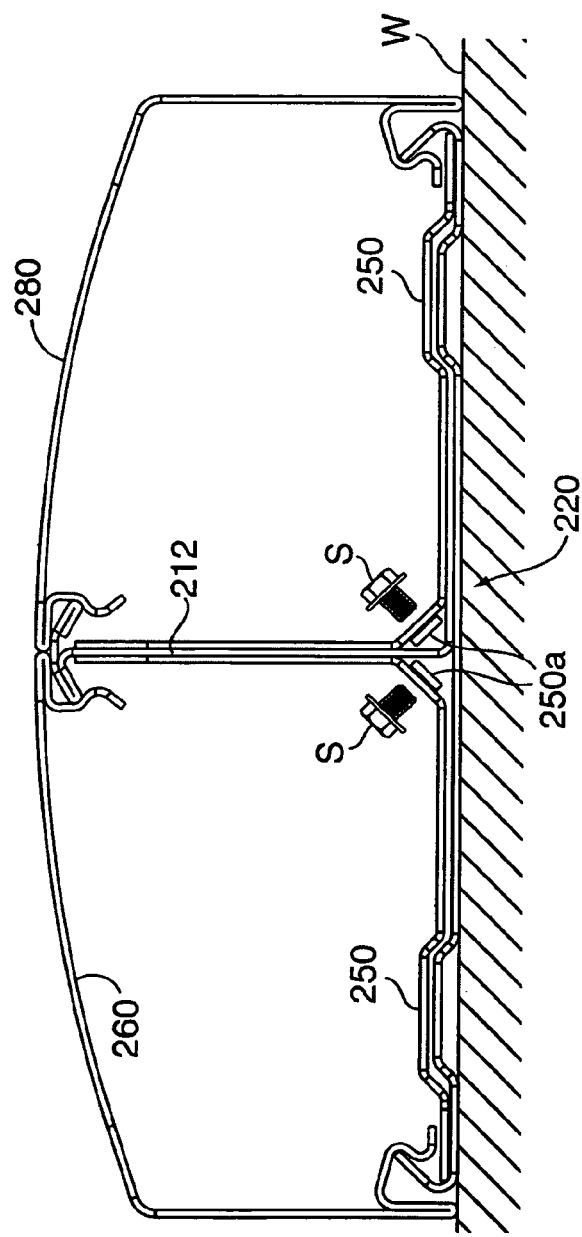
FIG. 17 is a vertical section through an assembled base 200 and cover pair 260 and 280, with a pair of raceway couplers 250, 250 snapped into the raceway base for holding adjacent base members in alignment.
Figure 17A:
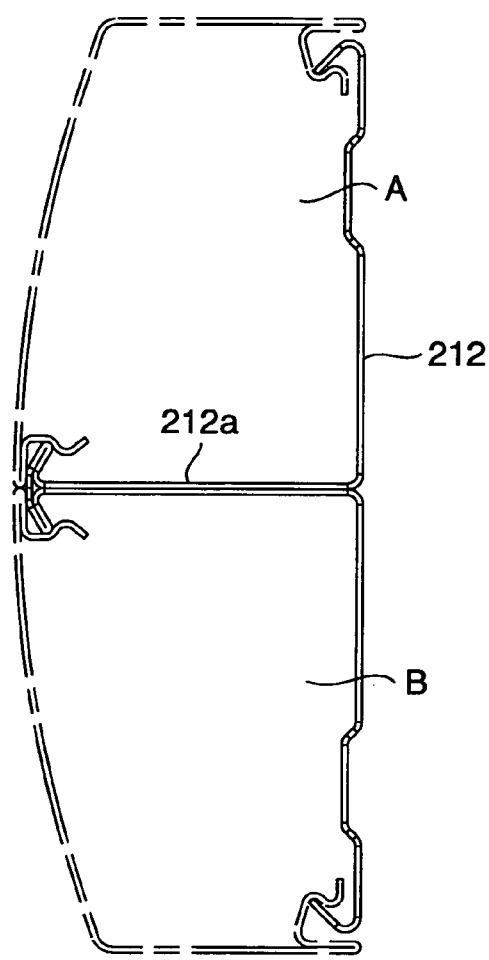
FIG. 17a shows a preferred one piece raceway base construction.

FIG. 17a shows a preferred one piece metal raceway base configuration with the top and bottom wireways, A and B respectively, defined by a web portion 212a formed with a double thickness, such that the web lager forms a 90° bend with the back of the "T", as shown at 220a.

Figure 17B:
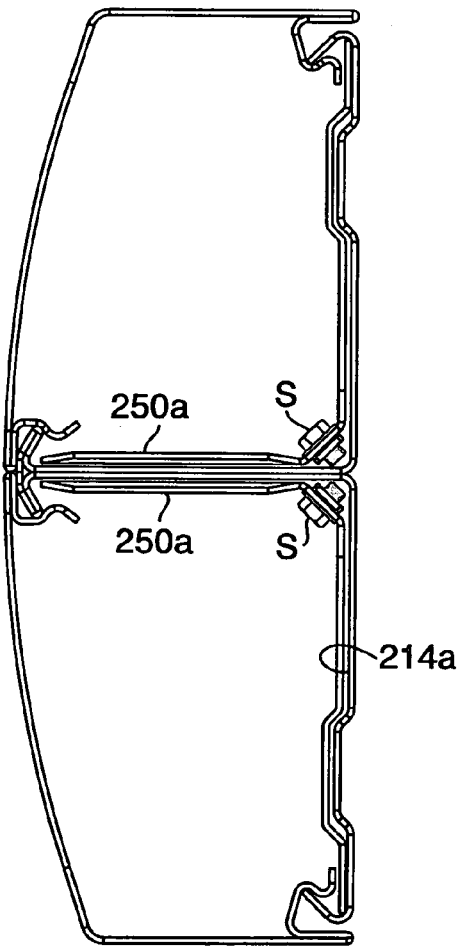
FIG. 17b is a view of FIG. 17a base assembled as in FIG. 17.

FIG. 17b is similar to FIG. 17 but shows slightly different coupler elements 250a, 250a with the base of FIG. 17a.

FIGS. 17 and 17b show the raceway coupling members 250 and 250a as held in place by screw fasteners S, S which are threadably received in openings provided for this purpose at the vertex of each coupling members 250 and 250a. FIGS. 17 and 17b also illustrate the nesting relationship between the back wall 214 and 214a of the raceway base 220, 220a and these coupling elements 250, 250a. It will be apparent that these coupling elements 250, 250a serve the purpose of coupling adjacent end portions of raceway base members as described above, without interfering with the raceway covers 260 and 280, the cover components being held in place by the same marginal edge portions of the raceway base and the lips defined at the free end portions of the web 212 all as described previously with reference to these raceway covers 260 and 280. Thus, the separate wireways defined by the T-shaped raceway base 220, 220a and the raceway covers 260/280 are continued and defined in part by these unique raceway coupling elements 250, 250.

FIG. 18 illustrates raceway assemblies 200, 200 coupled together, but in a way such that the coupler 500a also accommodates a T-connection between the upper wireway and a smaller electrical conduit 500 oriented at right angles to the raceway of the present invention. The coupler 500a is provided with a knockout opening to accommodate the conduit 500 and/or a large conduit can also be accommodated by reason of a somewhat larger knock-out opening.

Figure 19:
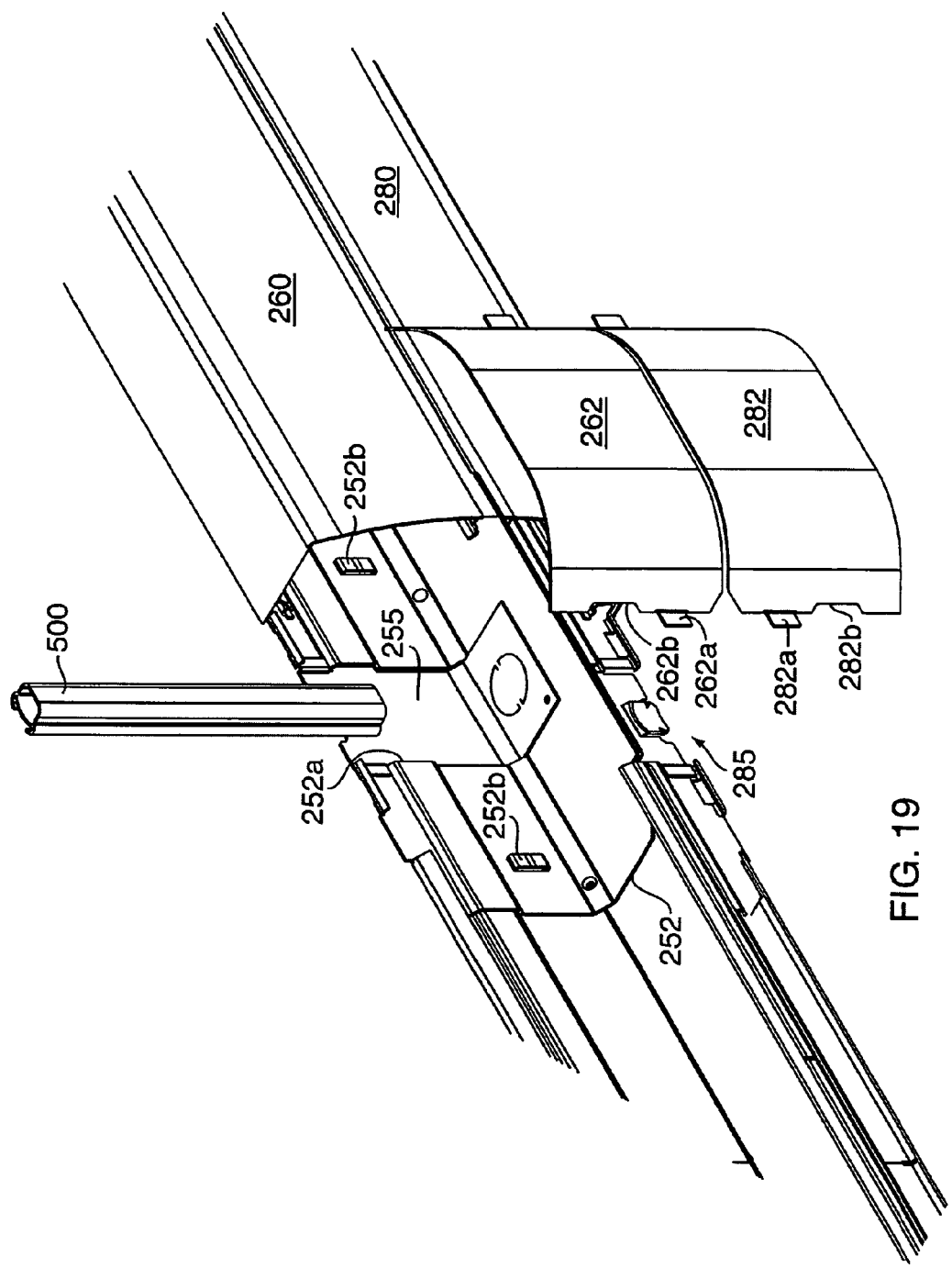
FIG. 19 is an exploded perspective view of some of the assembled components provided between the assembled raceway sections of FIG. 18.

FIG. 19 shows the coupler cover removed, and illustrates a coupling element 252 associated with the upper wireway having a cutout region 252a for receiving a bracket 255 designed to accommodate the conduit 500. As with the previously described couplings 250, 250, coupling element 252 spans the gap between spaced but aligned raceway base components. In accordance with the present invention cable guides 262 and 282 are provided to afford some protection for the cables or conductors provided in the wireways defined by the T-shaped base and the raceway cover components 260 and 280. These cable guides 262 and 282 are configured to allow such cables to pass through the wireways, when assembled with the coupling element 252, but to allow cables within the conduit 500 to run downwardly into the upper wireway, and to be fed in one direction or another of the upper wireway shown in FIG. 19. Tabs 262a on the upper cable guide 262 snap into slots 252b provided for this purpose in the wall of the coupling element 252 for this purpose. Relieved areas 262b allow cables within the conduit 500 to clear the cable guide 262. The lower cable guide 282 may be used to provide an access point in the lower wireway for feeding wires from the wall structure into the lower wireway. A port 285 is provided for this purpose in the lower coupling element as best shown in FIG. 19.

Figure 20:
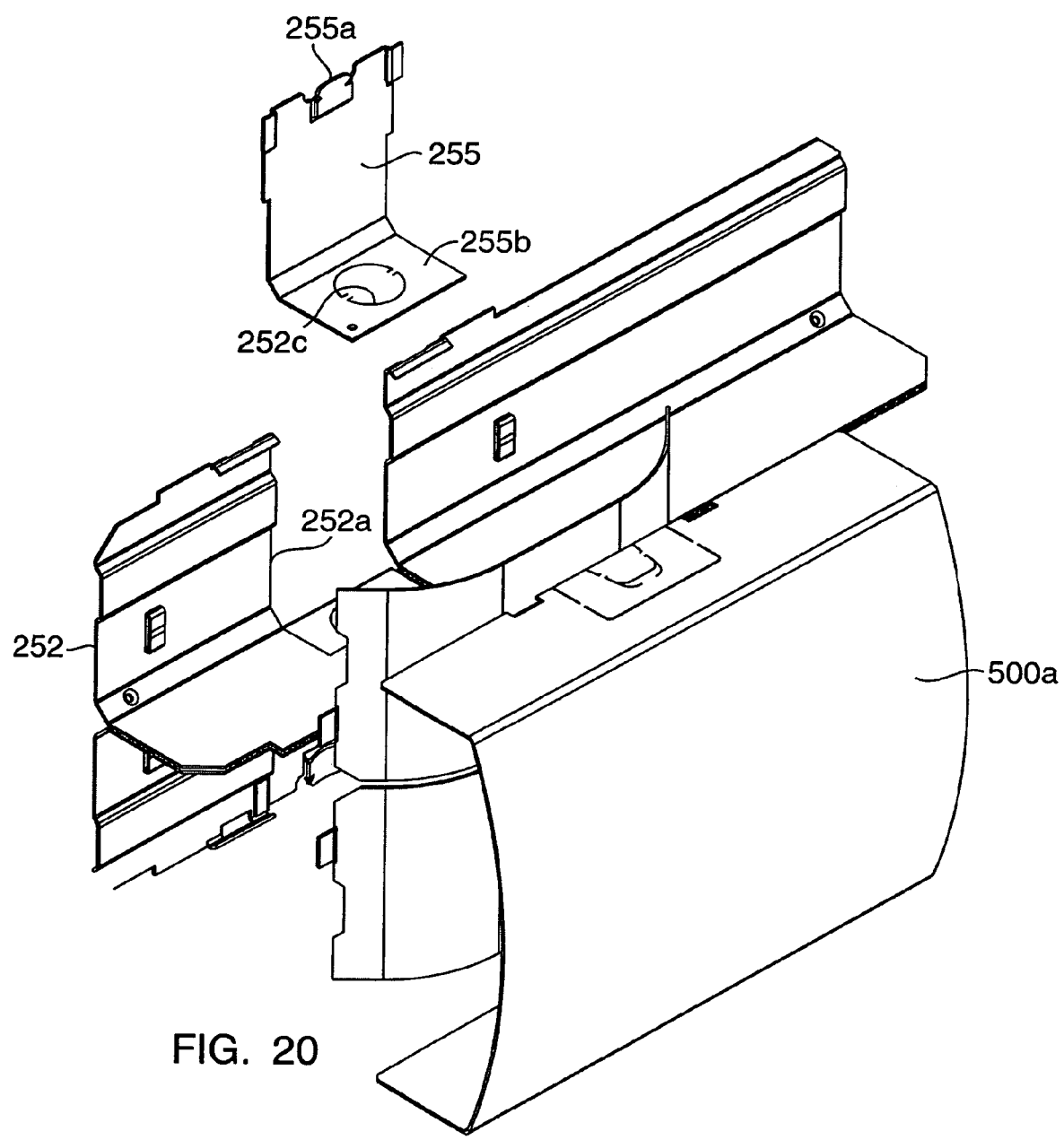
FIG. 20 is an exploded perspective view similar to FIG. 19, but without the raceway sections, and shows the raceway couplers provided in the top and bottom wireways defined by the raceway base plate and the raceway covers.

FIG. 20 is an exploded view showing the upper coupling element 252 having a relieved region 252a for receiving the L-shaped bracket 255 that serves to anchor the conduit 500 by means of tab 255a, and to include a lower portion 255b that defines a knockout opening for cables run to the lower wireway defined by the raceway assembly of FIG. 19. FIG. 20 also shows the coupling cover 500a together with its knockout openings in the top wall for receiving conduits such as illustrated at 500, or larger conduit as dictated by the needs of a particular installation.

Figure 21:
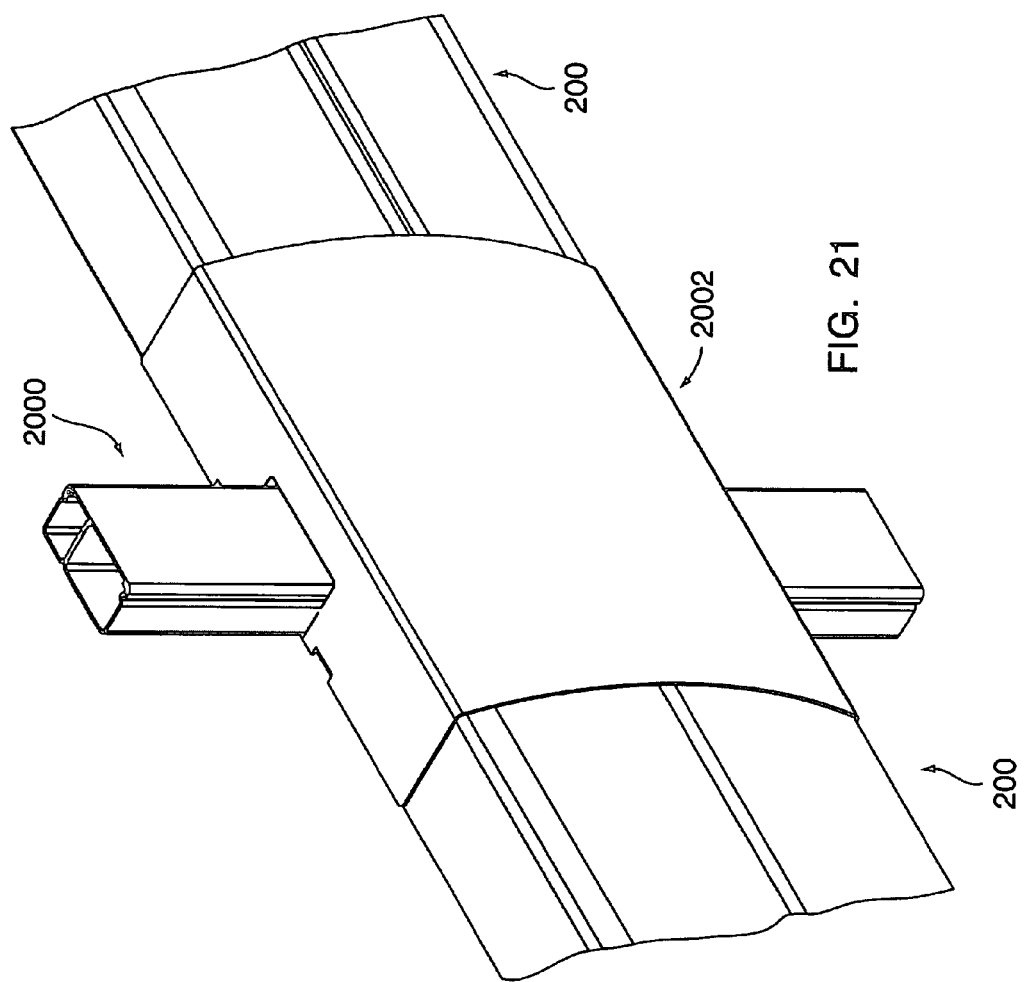
FIG. 21 shows two aligned raceway sections and a transition fitting similar to that shown in FIGS. 18, 19 and 20, but instead of providing access to wiring from and to another raceway 2000, the fitting 2002 serves to bridge raceway 2000 without any cross feeding of cables or wires.

FIG. 21 shows adjacent raceway assemblies of the present invention coupled as described previously to afford a bridge between the wireways defined therein and a crossing conduit 2000. Coupling 2002 is provided with knockout openings in both its top and bottom walls for this purpose.

Figure 22:
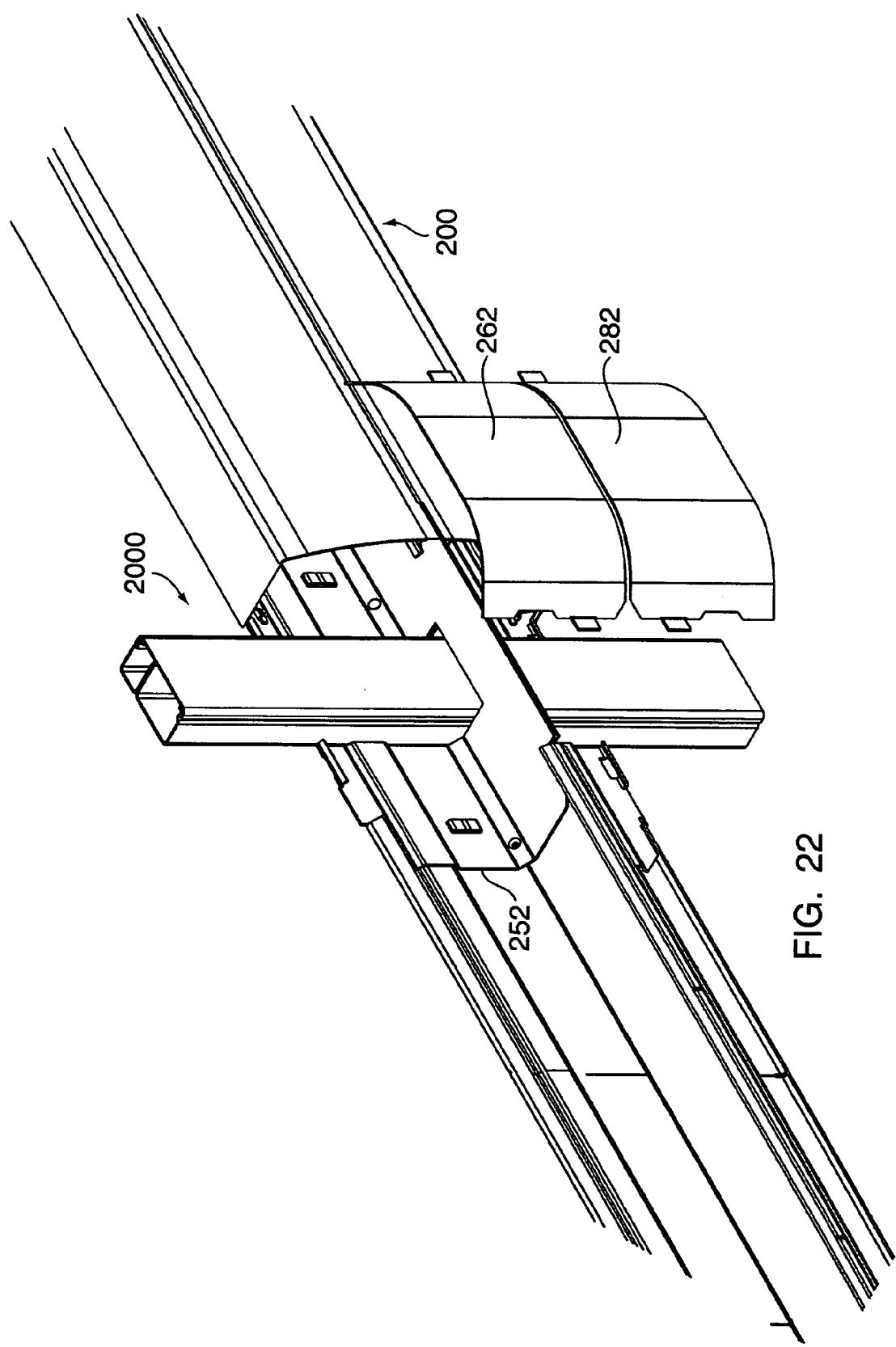
FIG. 22 shows the FIG. 21 assembly, but without the raceway covers in one base plate, and without the transitions fitting cover.

FIG. 22 shows the crossing conduit 2000 of FIG. 21 in greater detail, together with the raceway coupling elements 252 required to bridge the gap between the aligned ends of the raceway base components. From FIG. 22 it will be apparent that the L-shaped bracket of the previous views (FIG. 20 and 21) is not required, and it will further be apparent that the crossing raceway 2000 does not fed cables to the wireways defined in the raceway of the present invention. However, cable guides 262 and 282 are utilized in the same manner as described above to facilitate feeding of cables in these upper and lower raceways.

Figure 23:
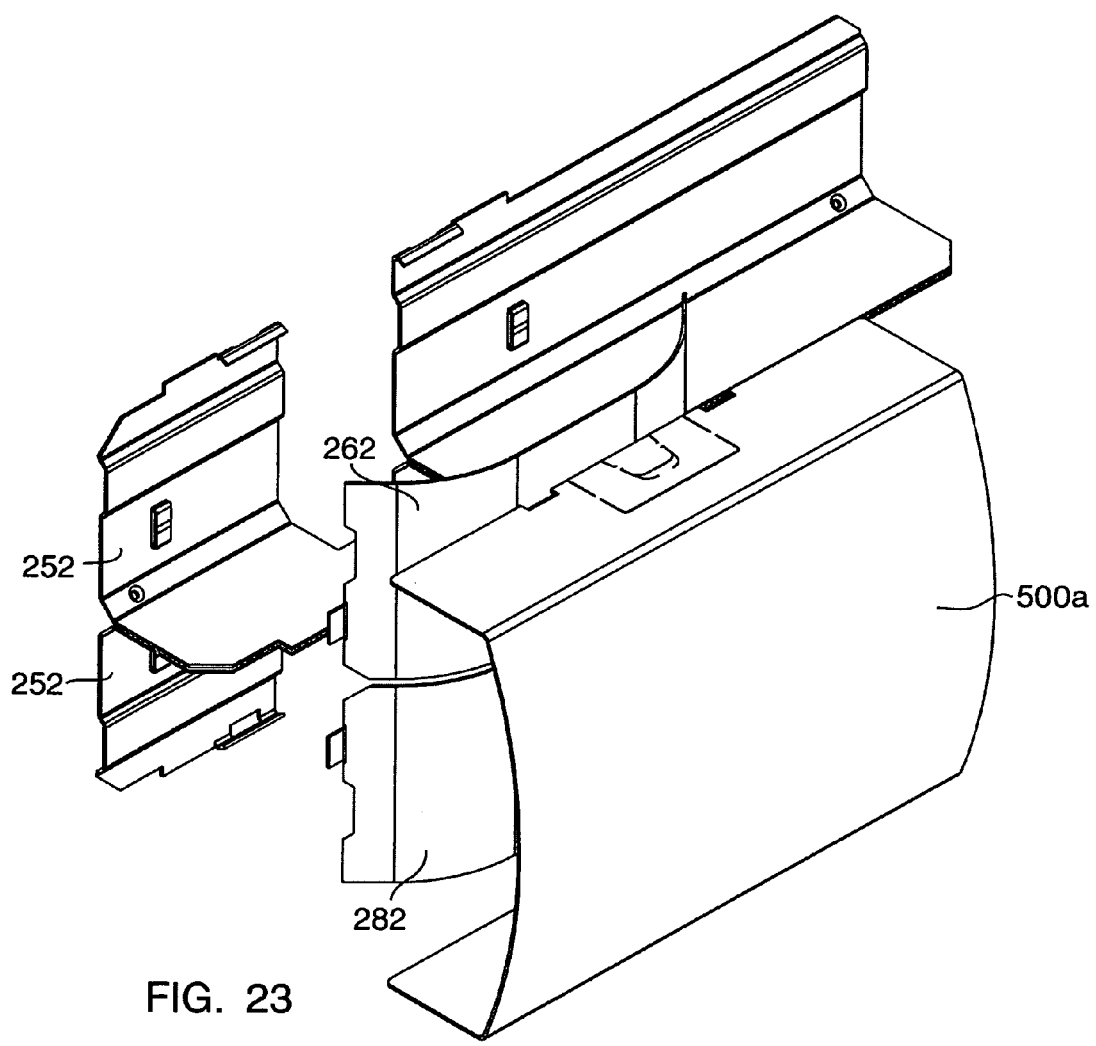
FIG. 23 shows the FIG. 21 assembly, but without the raceway base and covers, to better illustrate the unique coupling means comprising two L-shaped coupling elements arranged alongside one another an coextensively with respect to the spine (not shown) of the raceway base.

FIG. 23 shows the coupling elements 252, 252 associated with the upper and lower wireways of FIGS. 21 and 22, as well as the cable guides 262 and 282, and coupling cover 500a with a knockout opening pattern similar to that of the coupling cover 500a of FIGS. 18.

In FIG. 24-26 a raceway cover 279 has generally rectangular cutouts 270a for presenting outlet plugs 275 at longitudinally spaced predetermined intervals along the cover as, but shown in FIG. 26.

The cover 270 is similar to those described above and has longitudinally extending marginal edges of base plate as shown at the lower edge of base 320. An inner recess 270c forms a pocket to receive the edge 276a of a device bracket 276, also of L-shape, but fits into cover 270 to form a cavity for the outlet device 275. An upper edge 276b of L-shaped device bracket 276 fits into a recess defined at the top inside edge of cover 275a, shown at 270d. The device bracket 276 is of shorter extent than the outlet device 275 as suggested in FIG. 25.

As suggested in FIG. 24, power cables in the lower wireway of the raceway are connected to the terminals of the outlet devices in a conventional manner. These L-shaped covers 270 can be preassembled, as suggested in FIG. 26, for use with selected raceway assemblies of the type described above, for their simplifying the task of the installer.

Figure 27:
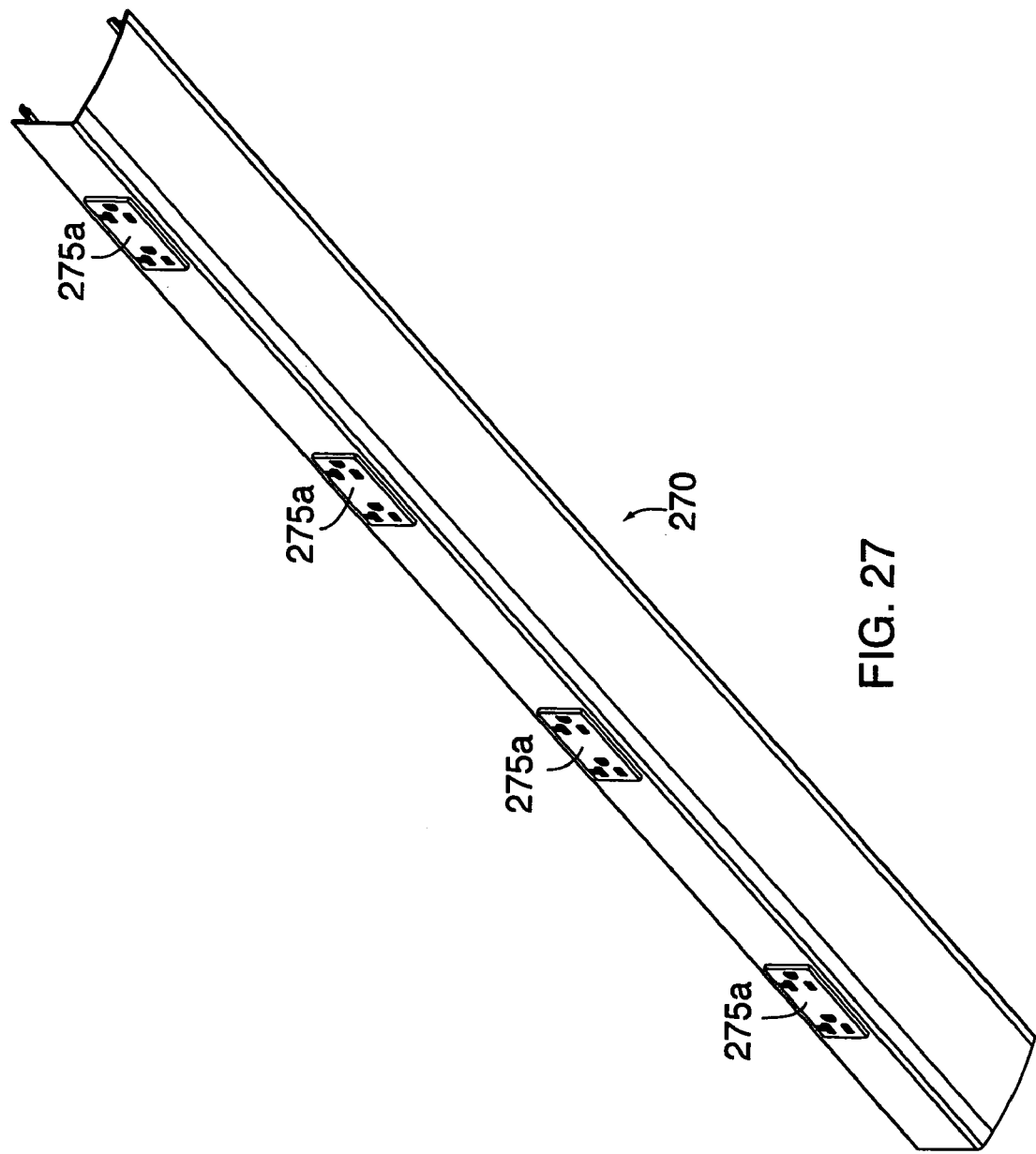
FIG. 27 shows the lower raceway cover component 270a with prewired outlets 275a in the lower wall of the cover, rather than in the forward wall as depicted in FIGS. 25 and 26.

FIG. 27 shows outlet devices of the duplex type mounted in the downwardly facing wall of raceway cover component 270a. Data/communication devices (not shown) of appropriate size might also be mounted in this lower wall of lower raceway cover 270a. This is so in spite of the preference for locating the data/communication cabling in the upper wireway, and the power cables in the lower wireway of a raceway assembly incorporating the present invention. The T-shaped base member preferably has knock-out openings such as shown in FIG. 16a that allow wiring from the upper wireway to pass through the web portion of the T-shaped base for this purpose.

The invention claimed is:

1. A modular raceway system comprising elongated raceway subassemblies, each of said raceway subassemblies including an elongated base having upper and lower plate portions for abutting a wall, said plate portions having upper and lower marginal edges respectively, coupling means for supporting said bases in longitudinal spaced alignment with one another to provide a range of gaps, between first and second raceway bases, said first raceway base having a length such that an adjacent second elongated base associated with an adjacent raceway subassembly can be aligned therewith, and be spaced therefrom, so as to provide a range of gap spaces between said first and second raceway bases, said first and second elongated bases each having a projecting web joined to said base plate portion intermediate said marginal edges to form a T-shaped cross section without sidewalls so as to define upwardly and downwardly open elongated wireways, said base web having a free marginal edge with oppositely projecting elongated lips, and upper and lower elongated raceway cover components of L-shape cross-section and having elongated marginal edge portions defining sockets for receiving said projecting lips on said base, and said cover components having opposite edge portions that mate with said upper and lower base marginal edges of said base respectively cooperating with said base to further define said upper and lower wireways respectively.

2. A modular raceway system comprising elongated raceway subassemblies, each of said raceway subassemblies including an elongated base having upper and lower marginal edges, coupling means for supporting said bases in longitudinal spaced alignment with one another to provide a range of gaps, between said bases, a first raceway base having a length such that an adjacent elongated base associated with an adjacent raceway subassembly can be coupled thereto, and be spaced therefrom, and in longitudinal alignment therewith, so as to provide a gap or space between said first and second raceway bases, said first and second elongated bases each having upper and lower marginal edges, and a projecting web joined to said base intermediate said marginal edges to form a T-shaped cross section, said base web having a free marginal edge with oppositely projecting elongated lips, upper and lower elongated raceway cover components having elongated marginal edge portions defining sockets for receiving said projecting lips on said base, and said cover components having opposite edge portions that mate with said upper and lower base marginal edges of said base respectively to define upper and lower wireways respectively, and individual device brackets for said upper and lower wireways, each individual device bracket having a frame with flanges received by one of said projecting lips of said base plate web, and each individual device bracket frame also having a rearwardly offset portion defining at least one rearwardly projecting leg portion with a free end defining a socket that mates with one of said upper and lower elongated marginal edges of said T-shaped base.

3. The modular raceway system according to claim 2 further including a device cover having a length in the longitudinal direction greater than that of said individual device bracket, said device cover having segments in the marginal edges thereof defining flanges received by said T-shaped base web lips, and said device covers having segments defining sockets received by one said T-shaped base upper and lower marginal edges.

4. The modular raceway system according to claim 2 wherein said elongated T-shaped raceway base has lateral lines of weakening at intervals along its length, and prepunched wall fastener openings provided between said lines of weakening.

5. The modular raceway system according to claim 1 wherein said coupling means comprising upper and lower L-shaped coupling elements slidably received in said upper and lower wireways, said coupling elements having end portions also of L-shape to conform to said T-shaped base cross section and cooperating with said L-shape cover components to form wireways in said range of gap spaces that have continuations of said T-shaped bases and define upwardly open and downwardly open wireways in said gap spaces.

6. A modular raceway system comprising:
a plurality of elongated raceway base plates, at least some of said base plates having lateral lines of weakening provided at predetermined intervals along said elongated raceway base plate to facilitate separating at a said line of weakening, and
coupling means for securing one of said at least some base plates to another base plate so that said base plates are aligned with one another, said coupling means overlying said aligned base plates to provide electrical continuity therebetween when said base plates are spaced apart longitudinally by a gap, said coupling means including end portions conforming in shape to said base plate shape and slidably received thereby, and intermediate portions between said end portions of said coupling means for spanning said gap between said bases, said coupling means end portions and said intermediate portions having the same cross section throughout the length so that a range of gaps can be accommodated and raceway cover components mounted to said base plates for spanning said gap and cooperating with said coupling means intermediate portion to define wireways that are enclosed, particularly at said gap.

7. The modular raceway system of claim 6 wherein said raceway base plates are T-shaped and said raceway cover components are L-shaped to define at least two enclosed wireways that are separated by a forwardly projecting web of said T-shaped base, the web and the base defining upwardly and downwardly open elongated wireways that are enclosed by said cover components.

8. The modular raceway system according to claim 7 wherein said coupling means comprise individual coupling elements provided in said wireways defined by said base and cover components, said coupling elements also having an L-shape cooperating with said cover components to define the said wireways at said gaps.

9. The modular raceway system according to claim 8 wherein at least some of said coupling elements include knock-out openings for receiving smaller raceways oriented perpendicular said modular raceway system.

10. The modular raceway system according to claim 9 further characterized by cable guide elements provided in said knockout defining openings to allow cables in the wireway defined by said modular raceway assembly to be drawn through the wireway without interference from said perpendicular raceway.

11. The modular raceway system according to claim 6 further characterized by at least one raceway slip cover for overlying the spaced end portion of said cover components of said aligned raceway assemblies.

12. A modular raceway system comprising a plurality of elongated raceway base plates, at least some of said base plates having lateral lines of weakening provided at predetermined intervals along said elongated raceway base plate to facilitate severing at a selected one of said lines of weakening, and raceway cover components for the raceway base plates, said base plates having upper and lower plate portions defining upper and lower marginal edges and having a spine portion projecting forwardly of said marginal edges to provide a T-shaped cross section for said base plate, and covers cooperating to define side by side upper and lower wireways separated by said elongated spine, and coupling means for securing aligned raceway base plates to one another and to provide electrical continuity therebetween, said coupling means comprising upper and lower coupling elements having end portions conforming to said T-shaped base cross section, said coupling elements being of L-shape cross section at said end portions to be slidably received by said T-shaped base so that said end portions reside adjacent to said upper and lower plate portions of said base, and more particularly reside adjacent to said forwardly projecting spine portions of said T-shaped base.

13. The modular raceway system according to claim 12 wherein said upper and lower raceway cover components are of L-shape, and said covers including front walls, and a top or bottom wall to define said upper and lower wireways.

14. The modular raceway system according to claim 13 wherein said raceway covers are spaced from one another to provide a space therebetween, and a device bracket secured to said raceway base in said space.

15. The modular raceway assembly according to claim 14 wherein said device bracket is of generally U-shape such that the base of the U lies adjacent to the base plate of the raceway assembly, and the lower leg of the U defines an opening for receiving an outlet device.

16. The modular raceway system according to claim 13 wherein some of the raceway covers associated with the lower wireway are spaced from one another to define a space therebetween, and a device bracket provided in said space, said device bracket having a generally U-shape with the base of the U adjacent the base plate in the raceway assembly, and with a leg defining an opening for receiving an outlet device whereby to present the outlet in the lower wall of the L-shaped raceway cover.

17. The modular raceway system according to claim 16 further characterized by a device bracket cover for overlying the space between the adjacent raceway cover components and said device bracket, said device bracket cover selected from a variety of differently configured covers associated with a variety of different devices.

18. A modular raceway system comprising a plurality of elongated raceway base plates, at least some of said base plates having lateral lines of weakening provided at predetermined intervals along said elongated raceway base plate to facilitate severing at a selected one of said lines of weakening, and raceway cover components for the raceway base plates, said base plates and covers cooperating to define side by side wireways separated by an elongated spine, and coupling means for securing aligned raceway base plates to one another and to provide electrical continuity therebetween, said raceway cover components are of L-shape, and said raceway base plate is of T-shape, said covers including front walls, and a top or bottom wall to provide top and bottom wireways, some of the raceway covers associated with the lower wireway are spaced from one another to define a space therebetween, and a device bracket provided in said space, said device bracket having a generally U-shape with the base of the U adjacent the base plate in the raceway assembly, and with a leg defining an opening for receiving an outlet device whereby to present the outlet in the lower wall of the l-shaped raceway cover, a device bracket cover for overlying the space between the adjacent raceway cover components and said device bracket, said device bracket cover selected from a variety of differently configured covers associated with a variety of different devices, an outlet box defining element held in said device bracket, and provided between said device bracket and said device bracket cover to surround and protect electrical connections made to the device installed in the device bracket.

19. A modular raceway system comprising a plurality of elongated raceway base members, and raceway cover components for the raceway base members, said base members having upper and lower marginal edges for receiving said cover components, and coupling means for spanning a gap between aligned raceway base members and to provide electrical continuity therebetween, said coupling means comprising coupling elements having end portions slidably received between said base marginal edges and residing adjacent to said base members, said coupling elements having intermediate portions residing in the gap between said aligned raceway base members, some of said raceway cover components spanning said gap between said spaced and aligned raceway base members, said some raceway cover components arranged in alignment with said raceway cover components so received on said gap defining raceway base members, said coupling elements cooperating with said some raceway cover components to form enclosed wireways in said gaps between said aligned raceway base members.

20. The modular raceway system according to claim 19 wherein said raceway base members include a web projecting forwardly to abut said raceway cover components and define separated wireways, and said coupling elements including upper and lower coupling elements conforming in cross-section to the cross-sectional shape of said base members whereby to span said gap and form continuations of said upper and lower wireways in cooperation with said some raceway cover components.

21. The modular raceway system according to claim 19, wherein said base members have upper and lower marginal edges for receiving said raceway cover components, said raceway base members further including plate portions intermediate said marginal edges, and a web portion intermediate said marginal edges to form a T-shaped cross-section without side walls so as to define upwardly and downwardly open elongated wireways enclosed at the front by said raceway cover components.

22. The modular raceway system according to claim 21, wherein said raceway cover components are of L-shaped cross-section, and wherein upper and lower raceway cover components enclose said upper and lower wireways respectively.

23. The modular raceway system according to claim 22 wherein, said raceway base web has a free marginal edge with oppositely projecting elongated lips, said upper and lower raceway cover components having elongated edge portions that mate with said elongated lips.

24. A modular raceway system comprising a plurality of elongated raceway base members, and raceway cover components for the raceway base members, said base members having upper and lower marginal edges for receiving said cover components and coupling means for spanning a gap between aligned raceway base members and to provide electrical continuity therebetween, said coupling means comprising coupling elements having end portions slidably received between said base marginal edges and residing adjacent to said base members, said coupling elements having intermediate portions residing in the gap between said aligned raceway base members some of said raceway cover components spanning said gap between said spaced and aligned raceway base members, said some raceway cover components arranged in alignment with said raceway cover components so received on said gap defining raceway base members, said coupling elements cooperating with said some raceway cover components to form enclosed wireways in said gaps between said aligned raceway base members at least some raceway covers are spaced from one another to provide a space therebetween, and a device bracket secured to said raceway base members in said space.

25. The modular raceway assembly according to claim 24 wherein said device bracket is of generally U-shape such that the base of the U lies adjacent to the base member, and the lower leg of the U defines an opening for receiving an outlet device.

26. The modular raceway system according to claim 25 wherein some of said raceway cover components are spaced from one another to define a space therebetween, and a device bracket provided in said space, said device bracket having a generally U-shape with the base of the U adjacent one base member marginal edge, said U-shape also with a leg defining an opening for receiving an outlet device.

27. The modular raceway system according to claim 26 further characterized by a device bracket cover for overlying the space between the adjacent raceway cover components and said device bracket, said device bracket cover selected from a variety of differently configured covers associated with a variety of different devices.

* * * * *

UNITED STATES PATENT AND TRADEMARK OFFICE
CERTIFICATE OF CORRECTION

PATENT NO.        : 7,262,371 B2                                          Page 1 of 1
APPLICATION NO. : 11/035,477
DATED             : August 28, 2007
INVENTOR(S)       : Mark Makwinski et al.

It is certified that error appears in the above-identified patent and that said Letters Patent is hereby corrected as shown below:

Column 15, Claim 18, line 8, please delete "[[l-shaped]]" and insert -- L-shaped --.

Column 16, Claim 24, line 16, please insert -- , -- after the word components.

Column 16, Claim 24, line 23, please insert -- , -- after the word members.

Signed and Sealed this

Fifteenth Day of January, 2008

JON W. DUDAS
*Director of the United States Patent and Trademark Office*